United States Patent
Tan et al.

(10) Patent No.: US 11,994,787 B2
(45) Date of Patent: May 28, 2024

(54) METHOD AND APPARATUS FOR CLOSED-LOOP CAMERA SHUTTER CONTROL AND REMEDIATION HARDWARE

(71) Applicant: Dell Products, LP, Round Rock, TX (US)

(72) Inventors: Geroncio O. Tan, Austin, TX (US); Daniel L. Hamlin, Round Rock, TX (US); Yao-Hsien Huang, New Taipei (TW); Yung-Sheng Lin, Bade District (TW)

(73) Assignee: DELL PRODUCTS LP, Round Rock, TX (US)

( * ) Notice: Subject to any disclaimer, the term of this patent is extended or adjusted under 35 U.S.C. 154(b) by 152 days.

(21) Appl. No.: 17/870,846

(22) Filed: Jul. 22, 2022

(65) Prior Publication Data
US 2024/0027876 A1      Jan. 25, 2024

(51) Int. Cl.
*G03B 11/04*     (2021.01)
*G01D 5/14*      (2006.01)
*G06F 1/16*      (2006.01)

(52) U.S. Cl.
CPC ........... *G03B 11/043* (2013.01); *G01D 5/142* (2013.01); *G06F 1/1686* (2013.01)

(58) Field of Classification Search
CPC .................................................. G03B 11/043
See application file for complete search history.

(56) References Cited

U.S. PATENT DOCUMENTS

| | | | |
|---|---|---|---|
| 8,797,451 B2 | 8/2014 | Bilbrey | |
| 8,902,318 B1 | 12/2014 | Haddad | |
| 11,082,594 B2 * | 8/2021 | Imai | ........................ G06F 21/31 |
| 11,178,319 B2 | 11/2021 | Li | |
| 11,347,321 B1 | 5/2022 | Tan | |
| 2013/0286224 A1 | 10/2013 | Stedman | |
| 2015/0009399 A1 | 1/2015 | Jonsson | |
| 2015/0163385 A1 | 6/2015 | Haddad | |
| 2017/0155810 A1 | 6/2017 | Haddad | |
| 2018/0004068 A1 | 1/2018 | Chen | |

(Continued)

FOREIGN PATENT DOCUMENTS

| KR | 20080040919 A * | 5/2008 | ........... G03B 11/043 |
|---|---|---|---|
| WO | 2019/236056 A1 | 12/2019 | |

*Primary Examiner* — Leon W Rhodes, Jr.
(74) *Attorney, Agent, or Firm* — Prol Intellectual Property Law, PLLC; H. Kenneth Prol

(57) ABSTRACT

An information handling system may include a processor, a memory device, a PMU, and a camera formed into a chassis of the information handling system. The camera includes a lens, a shutter to block the capture of an image by the camera, shutter driver hardware to actuate shutter movement between an open state and a closed state, and a shutter position sensor to detect the position of the shutter. The information handling system includes a microcontroller unit operatively coupled to the camera to receive input describing a set state of the shutter received from user toggle input, compare the set state of the shutter to a detected state of the shutter detected by the shutter position sensor and take remedial action to actuate the shutter driver hardware to change the detected state of the shutter when the detected state of the shutter differs from the set state of the shutter.

20 Claims, 7 Drawing Sheets

(56) References Cited

U.S. PATENT DOCUMENTS

| | | |
|---|---|---|
| 2018/0017843 A1 | 1/2018 | Tsai |
| 2019/0163034 A1 | 5/2019 | Tsai |
| 2021/0127045 A1 | 4/2021 | Clark |

* cited by examiner

METHOD AND APPARATUS FOR CLOSED-LOOP CAMERA SHUTTER CONTROL AND REMEDIATION HARDWARE

FIELD OF THE DISCLOSURE

The present disclosure generally relates to a camera formed into a chassis of an information handling system. The present disclosure more specifically relates to a shutter of a camera formed into a chassis of an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a camera used to capture images of a user engaged in a videoconference, among other tasks.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
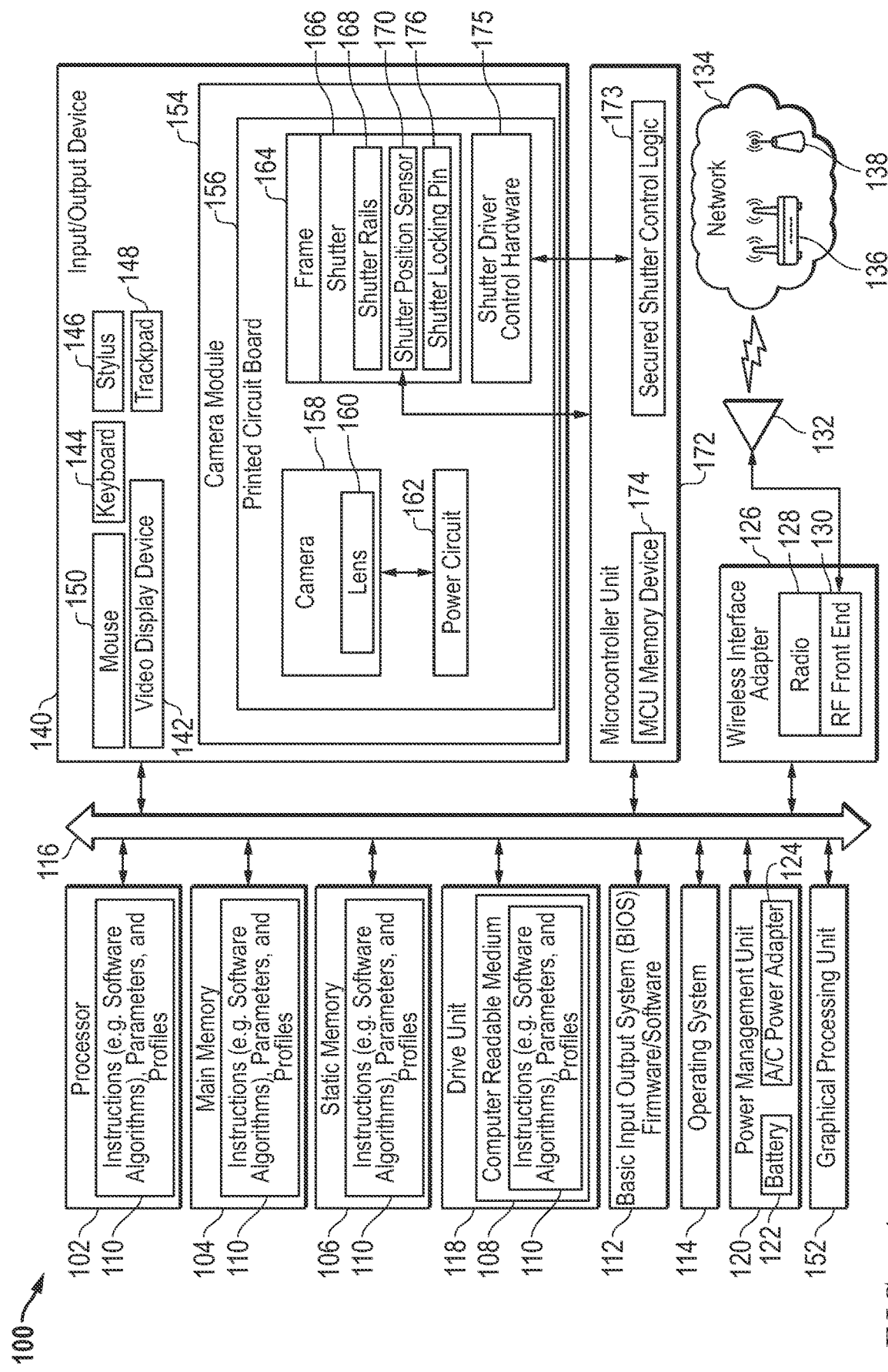
FIG. 1 is a block diagram of an information handling system with camera module according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems allow a user to communicate with others that are remoted from the user. Engaging in video conferencing sessions is one of these forms of communication. Although a camera installed in the chassis of the information handling system may be used for other purposes, the camera is popularly used to, in real-time, engage in these video conferences. The user, via the camera and execution by a processor of a video conferencing application, talk to another person remote from the user while seeing the user and providing video images of the user to that remote user as well. Often, the video conferencing applications give the user the ability to turn off the video feed of their camera so that others on the video conferencing sessions can no longer see the user. However, due to potential security breaches in the operating system (OS) or basic input/output system (BIOS) by others, an electromechanical shutter (EM shutter) has been implemented in order to prevent the user from being seen without the user knowing. This EM shutter may include a physical shutter that may be placed over the camera when the user does not want to be seen and may be activated by the user's action, in conjunction with security hardware circuit and firmware, or a combination thereof and isolated from software operation by a security hardware circuit to isolate any keypress from being hacked. These EM shutters, however, may fail due to the mechanical parts used to move the physical shutter in front of the camera. Indeed, a relatively high precision in the moving parts associated with the EM shutter is necessary and without that precision, the EM shutter may become dislodged, open at an intermediary point, closed at an intermediary point, or may not open or close at all. This issue becomes especially problematic if the information handling system is bumped or dropped.

The present specification describes an information handling system that includes a camera formed into a chassis of the information handling system. The camera may include a lens, a shutter to physically block the capture of an image by the camera and lens, and a shutter position sensor to detect the position of the shutter. In an embodiment, the shutter position sensor may include a Hall effect sensor and one or more magnets. The interaction between the Hall effect sensor and the magnets may indicate the state of the shutter: whether the shutter is closed, open, or stuck or otherwise positioned in an intermediary state. In other embodiments, digital image processing may determine whether an image is detected by the camera or not as a detector or confirmation of the state of the shutter since no image should be received if the shutter is closed and if a partial image is detected, that may be determined by digital signal processing of the image. In yet another embodiment, an ambient light sensor co-located with the camera or the camera sensor itself may be used to detect light levels to detect state of the shutter or confirm a detected state of the shutter. For example, if closed, not ambient light should be detected behind the shutter, whereas if partial or fully open shutter should register a first or second light level respectively with the ambient light sensor detector. In an embodiment, a microcontroller unit (MCU) may be used to compare a set state of the shutter to a detected state of the shutter as detected by the shutter position sensor. The MCU may include secured shutter control logic executing via firmware and that is isolated or protected from outside communication live access to reduce security threats of unauthorized access to the shutter control in some embodiments. Where the set state of the shutter and the detected state of the shutter are the same, the MCU may continue to receive input to open or close the shutter. Where the set state of the shutter and the detected state of the shutter are not the same, the MCU may take a remedial action.

In an embodiment, a remedial action may be necessary when, for example, the shutter is in or is detected to be in an intermediary state (e.g., either not fully closed or not fully open). This remedial action may include sending a signal to reinitiate the action at the shutter such as cause it to close or open. Remedial action may include increasing drive strength, for example via increased power, to shutter driver control hardware to dislodge or unseat a stuck shutter in an embodiment. Additionally, or alternatively, the remedial action may include actuating a locking pin used to lock the shutter in an open or closed position, or causing the shutter to be moved back and forth either randomly or in a pulsed movement of the shutter. By actuating a locking pin, the shutter may be dislodged if at an intermediate position. Additionally, or alternatively, the remedial action may include changing the order of operation of the shutter and locking pin in an attempt to agitate the shutter loose.

In an embodiment, where a threshold number of remedial actions has been conducted or where the MCU, via the shutter position sensor, detects that the remediations do not fix the operations of the shutter, a GUI may be generated by the MCU. The GUI may present to the user of the information handling system a warning indicating that the remedial actions have been initiated and that the shutter may not be operating correctly. This warning may provide notice to the user of the information handling system that the shutter requires repair. In some embodiments, a video feed may be terminated from the camera as a precaution at any point during the process of detecting the actual state of the shutter and the performance of any remedial action. In an embodiment, by counting the number of successful remedial actions that have been conducted, the MCU may estimate how many times the remediation can be conducted successfully. This data from the estimation may be used to pre-emptively warn or notify the user of impending failures of the shutter.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a tablet, a smartphone, a communications device, an access point (AP), a base station transceiver, a wireless telephone, a control system, a camera, a monitor with a built-in camera module, a scanner, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device and provide data storage resources, processing resources, and/or communication resources as described herein. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include memory (volatile (e.g., random-access memory, etc.), non-volatile (read-only memory, flash memory etc.) or any combination thereof), one or more processing resources, such as a central processing unit (CPU), a graphics processing unit (GPU) 152, processing, hardware, controller, or any combination thereof. Additional components of the information handling system 100 can include one or more storage devices, one or more communications ports for communicating with external devices, as well as various input and output (110) devices 140, such as a keyboard 144, a mouse 150, a video display device 142, a stylus 146, a trackpad 148, or any combination thereof. The information handling system 100 can also include one or more buses 116 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above, and operates to perform one or more of the methods described above. The information handling system 100 may execute code instructions 110 via processing resources that may operate on servers or systems, remote data centers, or on-box in individual client information handling systems according to various embodiments herein. In some embodiments, it is understood any or all portions of code instructions 110 may operate on a plurality of information handling systems 100.

The information handling system 100 may include processing resources such as a processor 102 such as a central processing unit (CPU), accelerated processing unit (APU), a neural processing unit (NPU), a vision processing unit (VPU), an embedded controller (EC), a digital signal processor (DSP), a GPU 152, a microcontroller, or any other type of processing device that executes code instructions to perform the processes described herein. Any of the processing resources may operate to execute code that is either firmware or software code. Moreover, the information handling system 100 can include memory such as main memory 104, static memory 106, computer readable medium 108 storing instructions 110 of, in an example embodiment, a video conferencing application, an image capturing application, or other computer executable program code, and drive unit 118 (volatile (e.g., random-access memory, etc.), nonvolatile (read-only memory, flash memory etc.) or any combination thereof).

As shown, the information handling system 100 may further include a video display device 142. The video display device 142, in an embodiment, may function as a liquid crystal display (LCD), an organic light emitting diode (OLED), a flat panel display, or a solid-state display. Although FIG. 1 shows a single video display device 142, the present specification contemplates that multiple video display devices 142 may be used with the information handling system to facilitate an extended desktop scenario, for example. Additionally, the information handling system 100 may include one or more input/output devices 140 including an alpha numeric input device such as a keyboard 144 and/or a cursor control device, such as a mouse 150, touchpad/trackpad 148, a stylus 146, or a gesture or touch screen input device associated with the video display device 142 that allow a user to interact with the images, windows, and applications presented to the user. In an embodiment, the video display device 142 may provide output to a user that includes, for example, one or more windows describing one or more instances of applications being executed by the processor 102 of the information handling system. In this example embodiment, a window may be presented to the user that provides a GUI representing the execution of that application.

The network interface device of the information handling system 100 shown as wireless interface adapter 126 can provide connectivity among devices such as with Bluetooth or to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 136 or base station 138 used to operatively couple the information handling system 100 to a network 134. In a specific embodiment, the network 134 may include macro-cellular connections via one or more base stations 138 or a wireless access point 136 (e.g., Wi-Fi or WiGig), or such as through licensed or unlicensed WWAN small cell base stations 138. Connectivity may be via wired or wireless connection. For example, wireless network access points 136 or base stations 138 may be operatively connected to the information handling system 100. Wireless interface adapter 126 may include one or more radio frequency (RF) subsystems (e.g., radio 128) with transmitter/receiver circuitry, modem circuitry, one or more antenna front end circuits 130, one or more wireless controller circuits, amplifiers, antennas 132 and other circuitry of the radio 128 such as one or more antenna ports used for wireless communications via multiple radio access technologies (RATs). The radio 128 may communicate with one or more wireless technology protocols. In and embodiment, the radio 128 may contain individual subscriber identity module (SIM) profiles for each technology service provider and their available protocols for any operating subscriber-based radio access technologies such as cellular LTE communications or 5G wireless communications. Non-subscriber-based wireless technologies may also be used such as Wi-Fi, WiFi-6, Bluetooth, Bluetooth low energy (BLE), and others.

In an example embodiment, the wireless interface adapter 126, radio 128, and antenna 132 may provide connectivity, such as via Bluetooth to one or more of the peripheral devices that may include a wireless video display device 142, a wireless keyboard 144, a wireless mouse 150, a wireless headset, a microphone, an audio headset, a wireless stylus 146, and a wireless trackpad 148, among other wireless peripheral devices used as input/output (I/O) devices 140.

As described, the wireless interface adapter 126 may include any number of antennas 132 which may include any number of tunable antennas for use with the system and methods disclosed herein. Although FIG. 1 shows a single antenna 132, the present specification contemplates that the number of antennas 132 may include more or less of the number of individual antennas shown in FIG. 1. Additional antenna system modification circuitry (not shown) may also be included with the wireless interface adapter 126 to implement coexistence control measures via an antenna controller in various embodiments of the present disclosure.

In some aspects of the present disclosure, the wireless interface adapter 126 may operate two or more wireless links. In an embodiment, the wireless interface adapter 126 may operate a Bluetooth wireless link using a Bluetooth wireless or BLE protocols. In an embodiment, the Bluetooth wireless protocol may operate at frequencies between 2.402 to 2.48 GHz. Other Bluetooth operating frequencies such as Bluetooth BLE frequencies are also contemplated in the presented description. In an embodiment, a Bluetooth wireless link may be used to wirelessly couple the input/output devices operatively and wirelessly including the mouse 150, keyboard 144, stylus 146, trackpad 148, and/or video display device 142 to the bus 116 in order for these devices to operate wirelessly with the information handling system 100. In a further aspect, the wireless interface adapter 126 may operate the two or more wireless links with a single, shared communication frequency band such as with the 5G standard relating to unlicensed wireless spectrum for small cell 5G operation or for unlicensed Wi-Fi WLAN operation in an example aspect. For example, a 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas 132 may be capable of operating at a variety of frequency bands. In a specific embodiment described herein, the shared, wireless communication band may be transmitted through a plurality of antennas used to operate in an N×N MIMO array configuration where multiple antennas 132 are used to exploit multipath propagation which may be any variable N. For example, N may equal 2, 3, or 4 to be 2×2, 3×3, or 4×4 MIMO operation in some embodiments. Other communication frequency bands, channels, and transception arrangements are contemplated for use with the embodiments of the present disclosure as well and the present specification contemplates the use of a variety of communication frequency bands.

The wireless interface adapter 126 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth standards, or similar wireless standards may be used. Wireless interface adapter 126 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the −5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 134 may be based on the radio access network (RAN) standards that implement, for example, eNodeB or gNodeB hardware connected to mobile phone networks (e.g., cellular networks) used to communicate with the information handling system 100. In the example embodiment, the information handling system 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end (e.g., antenna front end 130 circuits) of the information handling system 100 may operate on a licensed WWAN wireless radio with authorization for subscriber access to a wireless service provider on a carrier licensed frequency band.

In other aspects, the information handling system 100 operating as a mobile information handling system may operate a plurality of wireless interface adapters 126 for concurrent radio operation in one or more wireless communication bands. The plurality of wireless interface adapters 126 may further share a wireless communication band or operate in nearby wireless communication bands in some embodiments. Further, harmonics and other effects may impact wireless link operation when a plurality of wireless links are operating concurrently as in some of the presently described embodiments.

The wireless interface adapter 126 can represent an add-in card, wireless network interface module that is integrated with a main board of the information handling system 100 or integrated with another wireless network interface capability, or any combination thereof. In an embodiment the wireless interface adapter 126 may include one or more radio frequency subsystems including transmitters and wireless controllers for connecting via a multitude of wireless links. In an example embodiment, an information handling system 100 may have an antenna system transmitter for Bluetooth, 5G small cell WWAN, or Wi-Fi WLAN connectivity and one or more additional antenna system transmitters for macro-cellular communication. The RF subsystems and radios 128 and include wireless controllers to manage authentication, connectivity, communications, power levels for transmission, buffering, error correction, baseband processing, and other functions of the wireless interface adapter 126.

In an embodiment, the information handling system 100 may include a camera 158. In an embodiment, the camera 158 may be an input/output device 140 that captures images of the user and the surrounding area. As described herein, the camera 158 may be used during the execution of a videoconferencing application. Although the present specification contemplates that the camera 158 may be used for other purposes, the present specification describes the use of the camera 158 in connection with a videoconferencing session. The camera 158 may form part of a camera module 154 that may be placed within a display chassis of the information handling system 100. In the context of the present specification, the information handling system 100 may be any type of information handling system that includes a display chassis such as a 360-degree laptop type information handling system, a tablet information handling system, smartphones, or similar. In some embodiments, the chassis of a laptop type information handling system may include a display housing that includes an "a-cover" which serves as a back cover for the display housing and a "b-cover" which may serve as the bezel for a display screen of the information handling system such as a laptop information handling system. In this example embodiment, this laptop information handling system may have a chassis that forms a base housing and includes a "c-cover" housing a keyboard 144, touchpad/trackpad 148, and any cover in which these components are set, and a "d-cover" housing a processing device, memory, a power management unit (PMU) 120, wireless interface adapter and other components of the information handling system 100 in the base housing for the laptop-type information handling system 100. In an embodiment, the b-cover may include a portion of a video display device 142 and the present specification contemplates that the camera 158 may be placed behind either a bezel of the b-cover (when present) or behind the video display device 142 when a bezel is not present. In either example embodiment, a hole may be formed through the bezel or the video display device 142 so that the camera 158 can capture an image of the environment in front of the video display device 142 of the information handling system 100 including the user.

The camera module 154 includes a printed circuit board (PCB) 158 that operatively couples the components formed on the PCB 156 to each other as well as to a processor 102, a PMU 120, or a data storage device housed in, for example, the base chassis of the information handling system 100. The camera 158 may be operatively coupled to a cable connection, for example, in order to operatively couple the camera and the other components of the camera module 154 via the processor 102 via a ribbon cable or other wired data or power connection. The camera 158 may be any type of camera used to capture, in some embodiments, an image of the user while the user is engaged in, for example, a videoconferencing session with a remote user. A lens 160 may be included with the camera 158 to properly focus the image in the frame of the camera 158 and change that focus in some embodiments. This lens 160 may, in an example embodiment, include multiple lenses to achieve a specific focus or range of focus during operation of the camera 158.

The camera module 154 may further include a power circuit 162 operatively coupled to the camera 158 and other components of the camera module 154 on PCB 156 and, in an embodiment, to the PMU 120 of the information handling system 100. In an embodiment, the power circuit 162 may operate independent of the PMU 120 described herein. In another embodiment, the power circuit 162 may form part of or include the PMU 120. In an embodiment, the power circuit 162 is not formed on the camera module 154 with PCB 156 and, instead, is in the base chassis of the information handling system 100.

In an embodiment, the camera module 154 may include a frame 164. The frame 164 may be made of plastic and may be arranged above the camera 158. In an embodiment, the frame 164 may support one or more shutter rails 168. The shutter rails 168 may be used for the shutter 166 to ride along when the shutter 166 is being opened and closed. As described herein, the shutter 166 prevents an image of the user of the information handling system 100 from being transmitted and allowing the shutter 166 to be opened and closed by passing the shutter 166 along the shutter rails 168 allows for the user to open and close the shutter 166 when needed.

In an embodiment, the camera module further includes a shutter driver control hardware 175 operated by the execution of a secured shutter control logic 173 by the MCU 172, an embedded controller (EC), or other processing device. It is appreciated that although the present specification describes specific processing devices (e.g., an embedded controller, the MCU 172, the processor 102, or any other processing device) as completing processes described herein, the present specification contemplates that any processing devices may accomplish any of these processes. In some instances, secure processing devices may be used so that the processes executed by these secure processing devices cannot be accessed by a remote entity or computing device. The shutter driver control hardware 175 may, in an embodiment, include a driver motor that is operatively coupled to the shutter 166 that drives the shutter 166 back and forth along the shutter rails 168. In another embodiment, the shutter driver control hardware 175 may include a magnetic or electromagnetic drive system. The magnetic drive system may include a permanent magnet that interfaces with a magnet formed on the shutter 166 to either attract or repel the magnet on the shutter 166 to cause the shutter 166 to open or close. In an embodiment, the permanent magnet formed on the shutter 166 of the magnetic drive system may include one of the permanent magnets used by the shutter position sensor 170 (e.g., Hall effect sensor) to detect the position of the shutter 166 (e.g., closed, open, intermediary position). The electromagnetic drive system of the shutter driver control hardware 175 may, in an embodiment, include an electromagnet that may interface with a permanent magnet formed on the shutter 166 to either attract or repel the magnet on the shutter 166 to cause the shutter 166 to open or close. In an embodiment, the permanent magnet formed on the shutter 166 of the electromagnetic drive system may include one of the permanent magnets used by the shutter position sensor 170 (e.g., Hall effect sensor) to detect the position of the shutter 166 (e.g., closed, open, intermediary position). In an embodiment, the magnetic drive system may include an electropermanent magnet (EPM) that is switched off and on by a pulse of electric current in a wire winding around par to a permanent magnet. The EPM may interface with a permanent magnet formed on the shutter 166 to either attract or repel the magnet on the shutter 166 to cause the shutter 166 to open or close. In an embodiment, the permanent magnet formed on the shutter 166 of the electromagnetic drive system may include one of the permanent magnets used by the shutter position sensor 170 (e.g., Hall effect sensor) to detect the position of the shutter 166 (e.g., closed, open, intermediary position).

The shutter 166 and camera 158 assembly may further include a shutter position sensor 170. The shutter position sensor 170 may be any sensor that detects the location of the shutter 166. As described herein, the shutter 166 may be in a closed position with the shutter 166 placed over the camera 158 such that, even if the camera 158 is recording images, a black image is presented in the video feed. The shutter 166 may be in an open position with the shutter 166 moved away from the optics (e.g., lens 160) of the camera 158 so that the camera may provide an image of a user or the environment in front of the information handling system 100 on the video feed. In an embodiment, the mechanics of the camera 158 and shutter 166 assembly may accidentally cause the shutter 166 to be moved into a position between a fully closed and fully opened position. This intermediate position may cause a portion or edge of the shutter 166 to cover a portion of the camera 158. This will result in a distorted image of the user during operation of the camera 158. Additionally, because the shutter 166 is in an intermediate position, the shutter 166 is not operating as it should and may not be capable of being opened or shut again thereby preventing the user from selectively covering the camera 158 or not.

In an embodiment, the shutter position sensor 170 may include a hall effect sensor that detects a magnetic field from one or more magnets. In an embodiment, the hall effect sensor may be placed on a portion of the camera 158 with the one or more magnets placed on the shutter 166. In an embodiment, as the shutter 166 moves along the shutter rails 168, the hall effect sensor may detect the changes in the magnetic fields of the one or more permanent magnets by detecting changes in a current applied to a thin strip of metal at the hall effect sensor that produces a difference in electric potential between the two sides of the thin strip of metal. This difference in electric potential is proportional to the strength of the magnetic field detected by the Hall effect sensor thereby determining where, along the shutter rails 168, the shutter 166 is located. Where the Hall effect sensor detects a maximum voltage difference, the one or more magnets may be located the closest to the Hall effect sensor. Where the Hall effect sensor is placed at a location where the maximum voltage difference is detected, the shutter 166 may be either in a completely closed or completely open position in an embodiment.

In an alternative embodiment, the Hall effect sensor may interact with two permanent magnets. In an embodiment, the Hall effect sensor may be placed either on the shutter 166 or the camera 158 at a location where the Hall effect sensor can detect a maximum voltage difference when either of the first or second magnets are located near the Hall effect sensor.

Where the Hall effect sensor detects the magnetic field of the first magnet, the shutter 166 may be detected as closed. Where the Hall effect sensor detects the magnetic field of the second magnet, the shutter 166 may be detected as open. In the embodiments herein, where the Hall effect sensor does not detect a maximum voltage difference from either of the first or the second magnet, the Hall effect sensor detects that the shutter 166 is at an intermediate position. In an embodiment, a threshold voltage difference detected at the Hall effect sensor may be set such that if and when that threshold is not reached (e.g., where the maximum voltage difference is not detected), the Hell effect sensor detects that the shutter 166 is in an intermediate position.

In an embodiment, the shutter position sensor 170 may include a digital signal processor (DSP). The DSP may be any processing device used by the camera 158 to capture an image. This image may include variations in light and color that define an image. In an instance where the shutter 166 is open, the DSP may capture an image in front of the camera that consists of this variety of color and light. These colors and light are assigned color levels and light levels by the DSP that define the image or video captured by the camera 158. In another embodiment where the shutter 166 is closed, the DSP may also detect a single color (e.g., black) with low levels of light captured by the DSP. This data has a difference in color and light values that may indicate that the shutter 166 is open (e.g., a threshold variety of color and light values) or closed (e.g., a single color or little variety of color and light values). In an embodiment, this data may be sent to another processor for evaluation, or the DSP may indicate that these thresholds have been met and so indicate or confirm a state that the shutter 166 is open or closed or partially open. In an embodiment where the shutter 166 is neither completely closed or open (e.g., in a transitory state), similar color and light data may be evaluated by a processing device to determine if a portion of the image captured has a level of color variety and light above a threshold value while another portion of the image captured has a level of color variety and light below that threshold. If the color and light data associated with the image captured indicates that these the color variety and light values are above a threshold for a first portion of the image while the color variety and light values are not above a threshold for a second portion of the image, then the DSP may indicate that the shutter 166 is in a transitory state.

In an embodiment, the shutter position sensor 170 may include an ambient light sensor. An ambient light sensor may detect a level of light being received at the camera 158. In this embodiment, the ambient light sensor may detect whether a level of light has reached a threshold value that indicates that the shutter 166 is open, closed, or neither open nor closed. For example, a first threshold may be a high light threshold that indicates that the shutter 166 is in an open actual state. Additionally, a second threshold may be a low light threshold that indicates that the shutter 166 is in a closed state. In the instance where the ambient light sensor detects a level of light that neither meets the first or second thresholds, the shutter 166 may be determined to be in a transitory state.

Figure 4:
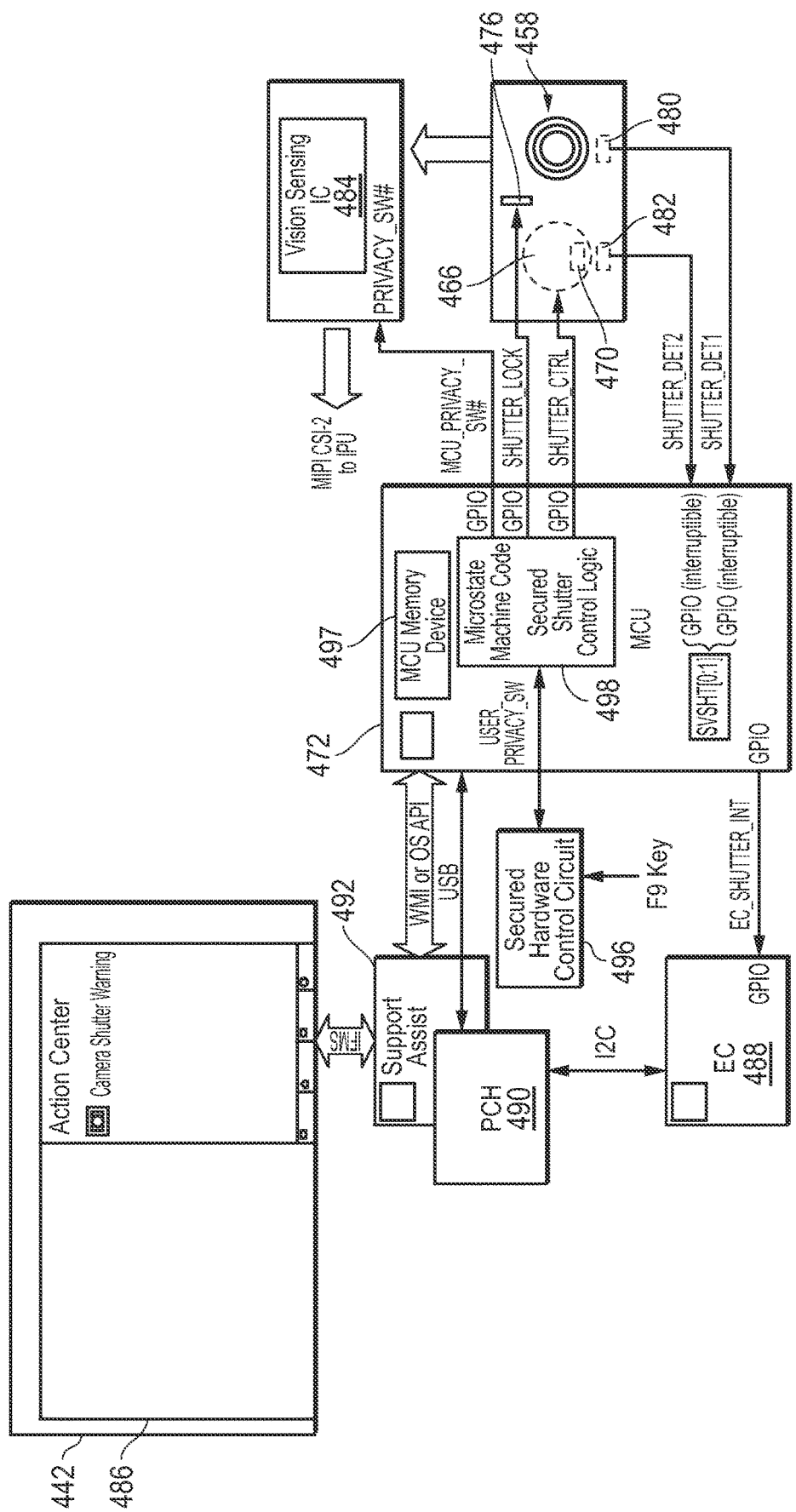
FIG. 4 is a block diagram of a shutter control and remediation system for a camera according to an embodiment of the present disclosure.

During operation of the shutter 166, a user may selectively open or close the shutter 166 by pressing a key (e.g., F9 key) or otherwise providing input to the information handling system 100. In an embodiment, a microcontroller unit (MCU) 172 or other processing resource may receive this input and cause the shutter 166 to selectively be opened or closed based on the current state of the shutter 166. The MCU 172 may include a secure shutter control logic 173 as described herein. The secured shutter control logic 173 may be isolated, in an embodiment, from the main systems bus 116 and secured from remote access. The secure shutter control logic 173 of the MCU 172 may be firmware, hardware, or a combination of both that is operatively coupled to the control shutter driver control hardware 175 from the MCU 172. In an embodiment, the secured shutter control logic 173 may be a hardware circuit that forms part of a secure keyboard hardware control circuit whereby a hardware circuit intercepts a physical keypress on the keyboard to generate an electronic control signal to MCU 172 from an electronic hardware circuit that is not connected to software control. The secure hardware control circuit for receiving keypress, or a button press or other input, to actuate shutter 166 is isolated from software and discussed and shown further in FIG. 4 below. In an embodiment, the MCU 172 may be a secure MCU 172 that operates independent of the basic input/output system (BIOS) 112 and operating system (OS) 114 of the information handling system 100. The security of the MCU 172 may allow for the shutter 166 to be manipulated by the user regardless of the operations of the camera 158 during, for example, the execution of a video conferencing application. Further, to manipulate shutter 166, a physical keypress must be received at the secure keyboard hardware control circuit to activate or deactivate the shutter and control the shutter driver hardware of the EM shutter via the MCU 172 in an example embodiment. In an embodiment, the MCU 172 may maintain a memory device 174 that stores the requested shutter state that describes the state that the shutter 166 should be in such as an open state or a closed state. The MCU 172 may monitor when the user toggles this state by pressing the key (e.g., F9) or otherwise providing input. Toggling the state of the shutter or providing "toggle input" may include switching the shutter from an open state to a closed state or a closed state to an open state utilizing the secure hardware control circuit as shown in FIG. 4 below. A user may, in an embodiment, may complete this toggling process by, as described herein, pressing a key such as the F9 key. The MCU 172 may be mounted on the PCB 156 of the camera modules 154 in some embodiments. In other embodiments, the MCU 172 may be operatively and communicatively coupled to the shutter position sensor 170 on the PCB 156 of the camera modules 154.

This desired or requested state of the shutter 166 may be referred to herein as the "set state" of the shutter 166. The set state of the shutter 166, in some example embodiments, may be different from the actual state of the shutter 166 as detected by the shutter position sensor 170 (e.g., Hall effect sensor interacting with one or more magnets at the shutter 166/camera 158 interface). In an embodiment, the MCU 172 may receive the output from the shutter position sensor 170 describing the position of the shutter 166 (e.g., open, closed, intermediate position). In those instances where the actual state of the shutter 166 as detected by the shutter position sensor 170 and the desired or requested state of the shutter 166 do not match, the MCU 172 may initiate a remedial action to correct the position of the shutter 166.

In an embodiment, an example remedial action may include an auto-recovery process that is initiated by the MCU 172 upon detection that the set state of the shutter 166 does not match the actual state of the shutter 166. This auto-recovery process may include, in example embodiments, the MCU 172 sending a signal to actuate the shutter 166 to either close or open the shutter 166. In the instance where the set state of the shutter 166 is to be closed and the actual state of the shutter 166 is neither closed or open per the output from the shutter position sensor 170, the shutter 166 is in an intermediate position and the actuation of the shutter 166 to either close or open the shutter 166 fully. Where the additional signal sent from the MCU 172 to either open or close the shutter 166 causes the shutter 166 to be fully opened or closed, the MCU 172 may save the actual state of the shutter 166 within the memory device 174 as the set state and, where necessary, complete the user's request to place the shutter 166 in the set state requested by initiating another signal to actuate the shutter 166. This may be completed where the user had requested that the shutter 166 be closed, the remedial action by the MCU 172 causes the shutter 166 to be opened, and the request to close the shutter 166 from the user has not been accomplished.

In an embodiment, the remedial action may alternatively or additionally include increasing the voltage applied to the shutter driver control hardware 175 to dislodge the shutter 166. The voltage applied to the shutter driver control hardware 175 in order to dislodge the shutter 166 may be increased or decreased over time and/or over a number of iterations of attempts to dislodge the shutter 166.

In an embodiment, the remedial action may alternatively or additionally include the actuation of a shutter locking pin 176. The shutter locking pin 176 may be a locking pin that mechanically locks the shutter 166 in a closed position, an opened position, or both when the shutter 166 is placed in these actual states. The remedial action conducted by the MCU 172 may include actuating the shutter locking pin 176 either before, after, and/or while the MCU 172 has sent the signal to either close or shut the shutter 166 during the remedial action. This process may allow the MCU 172 to determine whether the shutter locking pin 176 is preventing the shutter 166 from being completely opened or completely closed as detected by the shutter position sensor 170. In an embodiment, the actuation of the shutter locking pin 176 and the signal being sent to shut the shutter 166 may be alternated to dislodge the shutter 166 from the position it is in.

In an embodiment, the remedial action may include causing the shutter 166 to be moved back and forth. The driving of the shutter 166 back and forth may be done randomly or regularly pulsed back and forth to move the shutter 166 from the intermediation position it is in. This randomization of the movement or pulsed back and forth movement of the shutter 166 may dislodge the shutter 166 from a stuck position in some cases.

It is appreciated that any of these remedial actions may be completed any number of times. Further, multiple remedial actions may be completed in various orders. The order of any remedial actions may vary and may, in an example embodiment, include the repetition of a single type of remedial action. By executing multiple types of remedial actions, any number of times, and in any order, the MCU 172 may better dislodge the shutter 166 to place the shutter 166 in a closed or open state. In an example embodiment, the order of operation in attempting to move the shutter 166 via the shutter control hardware 175 and moving the shutter locking pin 176 may be varied in order to increase the likelihood of dislodging the shutter 166. The voltage applied to the shutter driving control hardware 175 may also be varied during this process to increase the likelihood of dislodging the shutter 166.

In an embodiment, the MCU 172 may provide a user with various notices as to the actual state of the shutter 166 and/or if and when remedial actions have been taken and the results of those remedial actions. In an example embodiment, the MCU 172 may maintain a count of how many times a remedial action was conducted based on the set state of the shutter 166 not matching the actual state of the shutter 166. This count may be maintained within the memory device 174. In an embodiment, when a threshold number of remedial actions has taken place, the MCU 172 may cause a graphical user interface (GUI) to be presented to the user at the video display device 142 of the information handling system 100 informing the user that these remedial actions has taken place. This GUI may further indicate to a user that the shutter 166 may need repairing, provide contact information for a repairman or repair location, and other information including warranty information.

The MCU 172 may further provide warning information on the GUIs presented. For example, in the instances where the remedial action conducted by the MCU 172 do not result in a correction of the actual state of the shutter 166 to match the set state of the shutter 166, the MCU 172 may provide a warning that the shutter 166 is not operating properly. This warning may be presented so that a view of the user by the camera 158 may not be captured without the user's consent and after a request to place the shutter 166 in a closed state. In an example embodiment, where a user has requested to set the shutter 166 to a closed state and the MCU 172 cannot successfully preform a remedial action to render the shutter 166 closed, the MCU 172 may prevent images of the user from being captured by the camera 158 by, for example, blocking the video stream from being transmitted to the processor 102 and being used during, for example, a videoconferencing session. It is appreciated that at any point during the process of detecting the actual state of the shutter and the performance of any remedial action, the video stream may be blocked as an additional precaution so that the image of the user is not seen by anyone without the user's knowledge. In an embodiment, the MCU 172 may immediately prevent images of the user from being captured by the camera 158 when the MCU has determined that the actual state of the shutter 166 does not match the set state of the shutter 166 as described herein. In an embodiment, the MCU 172 may interface with a control panel agent executed by the processor 102 that provides tools and diagnostics for the information handling system 100 on behalf of, for example, the manufacturer. This control panel agent may include the SupportAssist® by Dell®. By interfacing with the control panel agent, the MCU 172 may provide diagnostic information related to the remedial actions, if any, that were conducted by the MCU 172 so that the control panel agent may contact the user in an attempt to repair the shutter 166 if necessary. In an embodiment, the diagnostic information related to the remedial actions may be provided to a manufacturer of the information handling system 100 (e.g., Dell) for statistical analysis. This diagnostic information related to the remedial actions may, in an embodiment, also be used to warn the user of impending failures of the shutter 166 and provide contact information to the manufacturer of the information handling system 100 for servicing of the information handling system as described herein. If the remedial action is successful, the MCU 172 may allow images to resume being captured by camera 158, especially if the remedial action is to correctly put the shutter 166 in an open state in some embodiments.

In an embodiment, the camera module 154 may be operatively coupled to an embedded controller, GPU 152, processor 102, or other processing device that executes a circuit switch used to direct the power circuit 162 to apply an electrical charge to the components on the camera module 154 such as the camera 158 and a shutter motor or other shutter driver control hardware 175 used to move the shutter 166 from one position to another.

The information handling system 100 can include one or more set of instructions 110 that can be executed to cause the computer system to perform any one or more of the methods or computer-based functions disclosed herein. For example, instructions 110 may execute various software applications, software agents, or other aspects or components. For example, instructions 110 may include an information handling system software or firmware information handling system support application, such as Dell® Support Assist®, to generate a notification message or operate a GUI to notify a user of an error state in the shutter 166 detected by the position sensor 170 and sent by the MCU 172 to an embedded controller or processor 102 and the support application. Various software modules comprising application instructions 110 may be coordinated by an operating system (OS) 114, and/or via an application programming interface (API). An example OS 114 may include Windows®, Android®, and other OS types known in the art. Example APIs may include Win 32, Core Java API, or Android APIs.

The disk drive unit 118 and may include a computer-readable medium 108 in which one or more sets of instructions 110 such as software can be embedded to be executed by the processor 102 or other processing devices such as a GPU 152 to perform the processes described herein. Similarly, main memory 104 and static memory 106 may also contain a computer-readable medium for storage of one or more sets of instructions, parameters, or profiles 110 described herein. The disk drive unit 118 or static memory 106 also contain space for data storage. Further, the instructions 110 may embody one or more of the methods as described herein. In a particular embodiment, the instructions, parameters, and profiles 110 may reside completely, or at least partially, within the main memory 104, the static memory 106, and/or within the disk drive 118 during execution by the processor 102 or GPU 152 of information handling system 100. The main memory 104, GPU 152, and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The applications and associated APIs, for example, may be stored in static memory 106 or on the drive unit 118 that may include access to a computer-readable medium 108 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In an embodiment, the information handling system 100 may further include the PMU 120 (a.k.a. a power supply unit (PSU)). The PMU 120 may manage the power provided to the components of the information handling system 100 such as the processor 102, a cooling system, one or more drive units 118, the GPU 152, a video/graphic display device 142 or other input/output devices 140 such as the stylus 146, a mouse 150, a keyboard 144, and a trackpad 148 and other components that may require power when a power button has been actuated by a user. In an embodiment, the PMU 120 may monitor power levels and be electrically coupled, either wired or wirelessly, to the information handling system 100 to provide this power and coupled to bus 116 to provide or receive data or instructions. The PMU 120 may regulate power from a power source such as a battery 122 or A/C power adapter 124. In an embodiment, the battery 122 may be charged via the A/C power adapter 124 and provide power to the components of the information handling system 100 via a wired connections as applicable, or when A/C power from the A/C power adapter 124 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
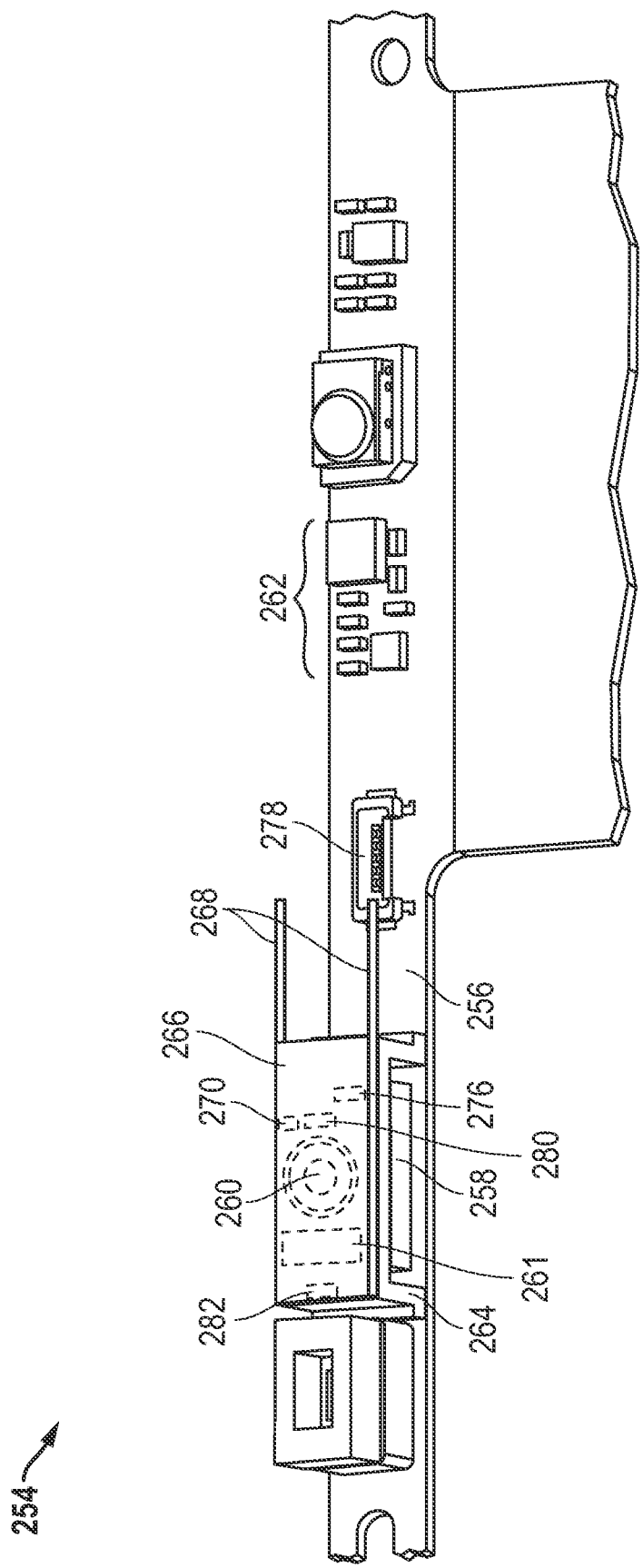
FIG. 2 is a graphic diagram of a camera module with a camera and shutter according to an embodiment of the present disclosure.

FIG. 2 is a graphic diagram of a camera module 254 with a camera 258 and shutter 266 according to an embodiment of the present disclosure. The components of the camera module 254 may be operatively coupled together or to the cable connection 278 via metal traces formed on the PCB 256 of the camera module 254. As described herein, the camera module 254 may be a modular unit that may be inserted behind a bezel in a display chassis of the information handling system. It is appreciated that some of the components may be formed on other PCB s within other chassis location of the information handling system or after locations on the camera module 254 shown in FIG. 2 in other example embodiments.

The camera module 254 shown in FIG. 2 includes a cable connection 278 used to operatively couple the components of the camera module 254 to, for example, an embedded controller, a PMU, and/or the processor of the information handling system as well as an MCU (e.g., MCU 172, FIG. 1) when the MCU is not located on the PCB 256. In other embodiments, the MCU may be mounted to the PCB 256 of the camera modules 254. In an embodiment, the connection may be a ribbon or flexible cable connection that may transmit data and power signals to the camera module 254 from the processing resources and power circuit respectively in those embodiments where, for example, the user or the power circuit are not formed on the camera module 254.

The camera module 254 may include a power circuit 262. In an embodiment, the power circuit 262 may be operatively coupled to the camera 258 and other components of the camera module 254, shutter driver hardware 261, and, in an embodiment, to the PMU of the information handling system via the cable connection 278. In an embodiment, the power circuit 262 may operate independent of the PMU described herein. In another embodiment, the power circuit 262 may form part of or include the PMU. In an embodiment, the power circuit 262 is not formed on the camera module 254 and, instead, is in the base chassis of the information handling system.

As described herein, the camera module 254 includes a camera 258. The camera 258 may be operatively coupled to a cable connection, for example, in order to operatively couple the camera and the other components of the camera module 254 to the processor of the information handling system via a ribbon cable or other wired connection. The camera 258 may be any type of camera used to capture, in some embodiments, an image of the user while the user is engaged in, for example, a videoconferencing session with a remote user. A lens at a lens position 260 may be included with the camera 258 to properly focus the image in the frame of the camera 258 and change that focus in some embodiments.

In an embodiment, the camera module 254 may include a frame 264. The frame 264 may be made of plastic and may be arranged above the camera 258. In an embodiment, the frame 264 may support the shutter rails 268 and shutter 266 over the camera 258 placing the shutter 266 at a distance away from the camera 258. The height of the frame 264 may depend on the height of the camera 258 and the distance that the shutter 266 is to be placed away from the lens 260 of the camera 258. In an embodiment, the frame 264 height may be such so at to place the shutter 266 near the lens of the camera 258 so that the shutter 266 may pass over the camera 258 unobstructed.

The shutter 266 may be operatively coupled to shutter driver hardware 261 that is operationally coupled to the power circuit 262 or other power source to advance the shutter 266 over or away from the camera 258 aperture and lens locations 260 and along the shutter rails 268. As described herein, the shutter driver hardware 261 may be operated per the signals received from the MCU to open or close the shutter 266. The shutter driver hardware 261 may, in an embodiment, include a driver motor that is operatively coupled to the shutter 266 that drives the shutter 266 back and forth along the shutter rails 268. A driver motor that is the shutter driver hardware 261 may include a low voltage electric motor such as a stepper motor, servo motor, or similar in some embodiments to drive the shutter 266 via any type of gearing or other interface with shutter 266 to move it laterally along a track. In another embodiment, the shutter driver control hardware 261 may include a magnetic or electromagnetic drive system. The magnetic drive system may include a permanent magnet that interfaces with a magnet (e.g., first permanent magnet 280, and a second permanent magnet 282) formed on the shutter 266 to either attract or repel the magnet on the shutter 266 to cause the shutter 266 to open or close. In an embodiment, the permanent magnet (e.g., first permanent magnet 280, and a second permanent magnet 282) formed on the shutter 266 of the magnetic drive system may include one of the permanent magnets used by the shutter position sensor 270 (e.g., Hall effect sensor) to detect the position of the shutter 266 (e.g., closed, open, intermediary position). The electromagnetic drive system of the shutter driver control hardware 261 may, in an embodiment, includes an electromagnet that may interface with a permanent magnet (e.g., first permanent magnet 280, and a second permanent magnet 282) formed on the shutter 266 to either attract or repel the magnet on the shutter 266 to cause the shutter 266 to open or close. In an embodiment, the permanent magnet formed on the shutter 266 of the electromagnetic drive system may include one of the permanent magnets (e.g., first permanent magnet 280, and a second permanent magnet 282) used by the shutter position sensor 270 (e.g., Hall effect sensor) to detect the position of the shutter 266 (e.g., closed, open, intermediary position).

As described herein, the camera module 254 may include a shutter position sensor used to detect the position of the shutter 266. FIG. 2 shows a specific type of shutter position sensor that includes a Hall effect sensor 270, a first permanent magnet 280, and a second permanent magnet 282. In an embodiment, the Hall effect sensor 270 may be placed either on the camera 258 or on a portion of the shutter 266. The first permanent magnet 280 and second permanent magnet 282 may be placed opposite the Hall effect sensor 270 either on the shutter 266 or on the camera 258, respectively. The orientation of the Hall effect sensor 270 to the first permanent magnet 280 and second permanent magnet 282 allows the Hall effect sensor 270 to detect the magnetic field created by either of these magnets 280, 282 when the shutter 266 is in an open or closed state. For example, when the shutter 266 is in a closed state as show in FIG. 2, the Hall effect sensor 270 detects the magnetic field of the first permanent magnet 280 and sends a signal to the MCU that the shutter 266 is closed. In an example embodiment, the shutter 266 is fully closed when the Hall effect sensor 270 detects a threshold voltage difference caused by the presence of the first permanent magnet 280. In an embodiment, the threshold voltage difference is +0.2 V. Where no voltage difference is detected (e.g., 0 V), the shutter 266 is determined to be either being conveyed from a closed position to an open position, or visa versa, or is at an intermediate state where the shutter 266 is stuck and requires the MCU to initiate a remedial action as described herein. In a similar example embodiment, the shutter 266 is fully open when the Hall effect sensor 270 detects a threshold voltage difference caused by the presence of the second permanent magnet 282. Again, this threshold voltage difference may be +2.0 V for example. Other threshold voltage differences may be detected including threshold voltage differences between the interaction between the first permanent magnet 280 and the Hall effect sensor 270 as compared to the second permanent magnet 282 interacting with the Hall effect sensor 270.

As described herein, where the threshold voltage difference is not detected by the Hall effect sensor 270 and a signal to either open or close the shutter 266 has already been sent by the MCU, the MCU may compare a set state of the shutter 266 (e.g., requested by the user via actuation of a key) to the actual state of the shutter 266. This may be done by determining whether the threshold voltage difference has been met at the Hall effect sensor 270. Where it has not, the MCU may initiate a remedial action to move the shutter 266 to a completely closed or completely open state if possible.

In an embodiment, an example remedial action may include an auto-recovery process that is initiated by the MCU upon detection that the set state of the shutter 266 does not match the actual state of the shutter 266. This auto-recovery process may include, in example embodiments, the MCU sending a signal to actuate the shutter 266 to either close or open the shutter 266 by attempting to move the shutter 266 along the shutter rails 268. In the instance where the set state of the shutter 266 is to be closed and the actual state of the shutter 266 is neither closed or open per the output from the shutter position sensor (e.g., the Hall effect sensor 270 and first permanent magnet 280 and second permanent magnet 282), the shutter 266 is in an intermediate position and the actuation of the shutter 266 to either close or open the shutter 266 fully. Where the additional signal sent from the MCU to either open or close the shutter 266 causes the shutter 266 to be fully opened or closed, the MCU may save the actual state of the shutter 266 within the memory device as the set state and, where necessary, complete the user's request to place the shutter 266 in the set state requested by initiating another signal to actuate the shutter 266. This may be completed where the user had requested that the shutter 266 be closed, the remedial action by the MCU causes the shutter 266 to be opened, and the request to close the shutter 266 from the user has not been accomplished.

In an embodiment, the remedial action may alternatively or additionally include increasing the voltage applied to the shutter driver control hardware 261 to dislodge the shutter 266. The voltage applied to the shutter driver control hardware 261 in order to dislodge the shutter 266 may be increased or decreased over time and/or over a plurality of iterations of attempts to dislodge the shutter 266. In an embodiment, the increased voltage may increase the action of the shutter driver hardware 261 such as a motor driver used to move the shutter 266. In an embodiment, the increased voltage signal may be sent to the motor driver a plurality times during this remedial action. Where the shutter driver hardware 261 includes an electromagnet or an EPM, the increased voltage may increase the electric field created by the electromagnet or EPM and, with this increased electric field, be capable of repelling or attracting the permanent magnets (e.g., first permanent magnet 280, and a second permanent magnet 282) formed on the shutter 266.

In an embodiment, the remedial action may alternatively or additionally include the actuation of a shutter locking pin 276. The shutter locking pin 276 may be a locking pin that mechanically locks the shutter 266 in a closed position, an opened position, or both when the shutter 266 is placed in these actual states. Locking pin 276 holds the shutter 266 in an open or closed state when activated so the shutter 266 does not slide upon movement or jarring of the information handling system in some embodiment. The locking pin 276 engages when the shutter 266 in opened or closed and may retract during transition. The remedial action conducted by the MCU may include actuating the shutter locking pin 276 either before, after, and/or while the MCU has sent the signal to either close or shut the shutter 266 during the remedial action. This process may allow the MCU to determine whether the shutter locking pin 276 is preventing the shutter 266 from being completely opened or completely closed as detected by the shutter position sensor. In an embodiment, the actuation of the shutter locking pin 276 and the signal being sent to shut the shutter 266 may be alternated to dislodge the shutter 266 from the position it is in.

It is appreciated that any of these remedial actions may be completed any number of times. Further, multiple remedial actions may be completed in various orders. The order of any remedial actions may vary and may, in an example embodiment, include the repetition of a single type of remedial action. By executing multiple types of remedial actions, any number of times, and in any order, the MCU 272 may better dislodge the shutter 266 to place the shutter 266 in a closed or open state. In an example embodiment, the order of operation in attempting to move the shutter 266 via the shutter control hardware and moving the shutter locking pin 276 may be varied in order to increase the likelihood of dislodging the shutter 266. The voltage applied to the shutter driving control hardware may also be varied during this process to increase the likelihood of dislodging the shutter 266.

In an embodiment, the MCU, EC, or other processing may provide a user with various notices as to the actual state of the shutter 266 and/or if and when remedial actions have been taken and the results of those remedial actions. In an example embodiment, the MCU or EC may maintain a count of how many times a remedial action was conducted based on the set state of the shutter 266 not matching the actual state of the shutter 266. This count may be maintained within the memory device. In an embodiment, when a threshold number of remedial actions has taken place, the MCU, EC or other processor may send a signal to an information handling system assist software to generate a GUI to be presented to the user at the video display device of the information handling system informing the user that these remedial actions has taken place. This GUI may further indicate to a user that the shutter 266 may need repairing, provide contact information for a repairman or repair location, and other information including warranty information.

The MCU or an EC may further provide warning information on the information handling system assist software GUIs presented to the user. For example, in the instances where the remedial action conducted by the MCU do not result in a correction of the actual state of the shutter 266 to match the set state of the shutter 266, the MCU or EC may provide a warning that the shutter 266 is not operating properly. This warning may be presented so that a view of the user by the camera 258 may not be captured without the user's consent and after a request to place the shutter 266 in a closed state. In an example embodiment, where a user has requested to set the shutter 266 to a closed state and the MCU but the detected state does not match the set state as being closed, the MCU may send a command to a processor executing a camera driver to prevent images of the user from being captured by the camera 258 by, for example, blocking the video stream from being transmitted to the processor and being used during, for example, a videoconferencing sessional in case the MCU cannot successfully perform a remedial action to render the shutter 266 closed. In an example embodiment, where a user has requested to set the shutter 266 to a closed state and the MCU does successfully perform a remedial action to render the shutter 266 closed, the MCU may then send a command to a processor executing a camera driver to again allow images to be captured by the camera 258 for when the shutter 266 is opened again. In an embodiment, the MCU, an EC or other processor may interface with a control panel agent of the information handling system assist software executed by the processor that provides tools and diagnostics for the information handling system on behalf of, for example, the manufacturer. This control panel agent may include an information handling system assist software such as the SupportAssist® by Dell®. By interfacing with the control panel agent, the MCU, the EC, or other processor may provide diagnostic information related to the remedial actions, if any, that were conducted by the MCU so that the control panel agent may contact the user in an attempt to repair the shutter 266 if necessary. In an additional embodiment, this information may be transmitted back to a central information handling system management system, such as SupportAssist®, with the user's permission for statistical analysis. In some embodiments, the information may be used by the EC or other processor to warn the user of impending failures or to contact service support before a failure occurs.

Figure 3A:
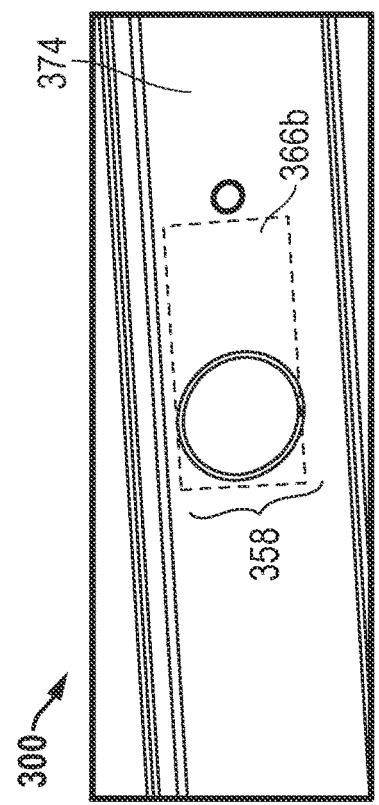
FIG. 3A is a graphic diagram of a camera with a shutter in an open position in an embodiment of the present disclosure.
Figure 3B:
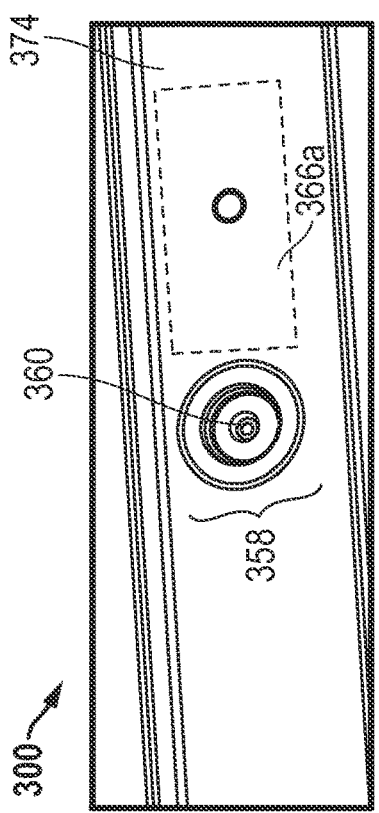
FIG. 3B is a graphic diagram of a camera with a shutter in a closed position in an embodiment of the present disclosure.
Figure 3C:
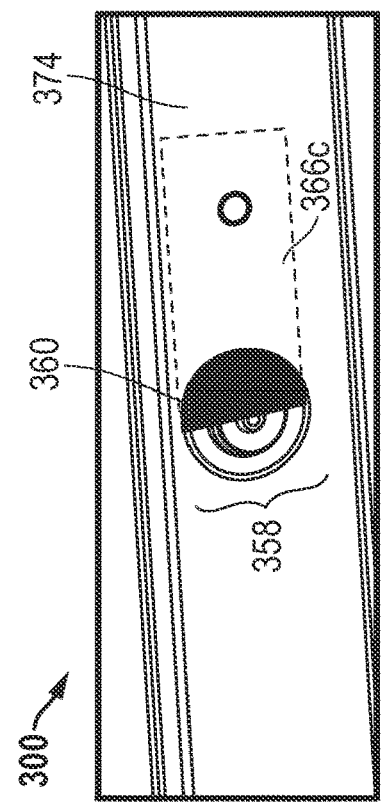
FIG. 3C is a graphic diagram of a camera with a shutter in a position intermediate to an open position and closed position in an embodiment of the present disclosure.

FIG. 3A is a graphic diagram of a camera with a shutter in an open position in an embodiment of the present disclosure. FIG. 3B is a graphic diagram of a camera with a shutter in a closed position in an embodiment of the present disclosure. FIG. 3C is a graphic diagram of a camera with a shutter in a position intermediate to an open position and closed position in an embodiment of the present disclosure. These three figures depict images of what user of an information handling system 300 may see when the shutter has been opened, closed, and is stuck in an intermediate position, respectively. Dotted line boxes for the shutter position location 366a, 366b, and 366c relative to the camera 358 are shown in these positions as examples. As described herein, the b-cover or bezel cover of the display chassis of the information handling system may include a portion of a video display device (not shown) and the present specification contemplates that the camera 358 may be placed behind either a bezel 374 of the b-cover or bezel cover or behind the video display device when a bezel 374 is not present. In an embodiment, the camera 358 may be placed at the top center of the bezel 374. In an embodiment, the camera 358 may be placed at a bottom center of the bezel 374.

In either example embodiment, a hole (e.g., a hole with a clear piece of glass or other transparent cover therein) may be formed through the bezel 374 or the video display device so that the camera 358 can capture an image of the environment in front of the information handling system including 300 and the user. In an embodiment shown in FIG. 3A, the shutter is shown in a first shutter position location 366a which may be described herein as being in an open state. In an embodiment shown in FIG. 3B, the shutter is shown in a second shutter position location 366b which may be described herein as being in a closed state. As described herein, the open state and closed state may be viewable by the user when the user can see the camera 358 and when the user cannot see the camera 358 when the shutter is in the second shutter position location 366b, respectively. In an embodiment, a shutter locking pin may be used to secure the shutter in the open and/or closed state when the shutter is placed into these shutter position locations 366a or 366b.

In some instances, the shutter may be placed in a third shutter position location 366c that is referred to herein as an intermediary position. The shutter may be accidentally placed in this intermediate position when, for example, the information handling system 300 has been bumped, the components of the camera module (e.g., shutter rails, shutter motor, power circuit, etc.) are not working properly, or due to wear and tear on these components of the camera module. When the shutter is accidentally placed within this third shutter position location 366c, the shutter may be deemed to not be working properly. Under these circumstances and when the MCU has determined that the set state of the shutter does not match its actual position (e.g., an intermediate position does not equal either a close or open state), the MCU may take those remedial actions as described herein to move the shutter into either one of the first shutter position location 366a or second shutter position location 366b. It is also anticipated that the open set state (e.g., shutter position location 366a) does not match an actual closed state (e.g., shutter position location 366b). This situation may also be remediated by the MCU executing remedial actions as described herein.

FIG. 4 is a block diagram of a shutter control and remediation system for a camera 458 according to an embodiment of the present disclosure. As described herein, the shutter control and remediation system may include an MCU 472 interfacing with a shutter position sensor to determine if and when the shutter is open, closed, or accidentally placed in an intermediate state.

FIG. 4 shows a camera 458 that includes a shutter actuated by a shutter driver hardware 466 that is used to selectively cover and uncover the lens of the camera 458. In the shown embodiment, the location 466 shows shutter driver hardware location as well as the shutter and where it would actuate from to cover camera 458. As described, the camera 458 includes a shutter position sensor that, in this example embodiment, includes a first Hall effect sensor 480 and a second Hall effect sensor 482. As the shutter moves and a magnet shown at a magnet location 470 attached thereto are near the first Hall effect sensor 480 or the second Hall effect sensor 482, the MCU 472 may detect the position of the shutter. In another embodiment, the first Hall effect sensor 480 and/or second Hall effect sensor 482 may be placed either on the shutter or the camera 458 body at a location where the Hall effect sensor can detect a maximum voltage difference when the magnet is located near either of the first Hall effect sensor 480 or second Hall effect sensor 482. In embodiments herein, the Hall effect sensor or sensors and the magnet or magnets may be oriented such that the Hall effect sensors are on the body of the camera 458 and the magnets are on the shutter or the reverse. Where the first Hall effect sensor 480 detects the magnetic field of the permanent magnet at the magnet location 470, the shutter may be detected as closed with the MCU 472 receiving a high voltage induction via an output SHUTTER_DET1 while receiving a low voltage induction at a second output SHUTTER_DET2. This is descriptive of the situation where the Hall effect sensors 480, 482 senses the magnetic field of the permanent magnet 470. Where the second Hall effect sensor 482 detects the magnetic field of the permanent magnet 470, the shutter may be detected as open receiving a high voltage via the second output SHUTTER_DET2 while receiving a low voltage at the first output SHUTTER_DET1. This is descriptive of the situation where the second Hall effect sensor 482 senses the magnetic field of the permanent magnet 470 as it moves with the shutter. In the embodiments herein, where the Hall effect sensors 480, 482 to not detect a high voltage from either of the first Hall effect sensor 480 or the second Hall effect sensor 482, this indicates that the shutter is at an intermediate position. In an embodiment, a threshold voltage difference detected at the Hall effect sensor 480, 482 may be set such that if and when that threshold is not reached (e.g., where the maximum voltage difference is not detected), the Hall effect sensors 480, 482 detects that the shutter is in an intermediate position.

It is appreciated that other sensors or arrangements of one or more Hall effect sensors and permanent magnets may be used to detect the position of the shutter. In an example embodiment, the Hall effect sensors may be operatively coupled to the shutter with a first magnet being placed at a first end of the camera 458 and a second magnet being placed at a second end of the camera 458. In this example embodiment, the output from the Hall effect sensor or sensors indicate that a threshold voltage is detected such that the shutter is open. Additionally, the output from the Hall effect sensor or sensors, in this example embodiment, indicating that another threshold voltage is detected may indicate that the shutter is closed.

Regardless of the type or arrangement of the shutter position sensor, the MCU 472 may be provided with input descriptive of the position of the shutter whether that actual position is closed, open, or at an intermediate position. Concurrently, the MCU 472 may receive input from an embedded controller (EC) 488 via the secured hardware circuit 496 to receive a physical key press, button actuation, capacitive touch detection, or other physical input to set or indicate the set state of the shutter. As described herein, the set state of the shutter is determined by input from the user requesting that the shutter be opened or closed. For example, during operation of the information handling system, the user may press a key (e.g., F9) or provide other input indicating a desire that the shutter be closed or opened. Pressing the key to toggle the state of the shutter from opened to closed may be controlled and isolated from software control via use of a secured hardware circuit 496 to receive a keypress from a key such as F9 and only with electronic circuit switching from that hardware isolated key function does a signal indicating the keypress get registered to drive shutter driver 466 to the change the physical state of the shutter over camera 458 in an embodiment. In particular, this secure hardware circuit 496 to isolate the key press from malicious access by a software attack and avoid unauthorized operation of the shutter is achieved by the isolated electronic circuit and control through the secured hardware circuit 496. An example secured hardware circuit 496 is described further in U.S. Pat. No. 11,347,321 which is incorporated herein by reference. After receiving the set state of the shutter and the actual state of the shutter from sensors such as the first and second Hall effect sensors 480, 482, the MCU 472 may compare the two values. For example, where the set state is equal to the actual state of the shutter (e.g., open set state=open actual state; closed set state=closed actual state), the MCU 472 may continue to operate the shutter via the shutter driver hardware 466 (including the shutter) to either close or open the shutter per the input received from the user. In an embodiment, data descriptive of the set state and the actual state of the shutter may be maintained at an memory device 497 that maintains the secured shutter control logic 498 and secured hardware control circuit 496 such as secure firmware used and executed by the MCU 472 to provide signals to the shutter driver hardware 466 such as a shutter actuation motor to move the shutter and other machine-readable program code used by the MCU 472 to affect the processes described herein. In an embodiment, a secured hardware control circuit 496 and secured shutter control logic 498 may be used by the MCU 472 to securely communicate with other hardware within the information handling system including a keyboard or other input device that receives, from a user, input to switch the open or closed state of the shutter by driving the shutter driver hardware 466. As described herein, this input may be stored in a memory device 497 for comparison, by the MCU 472 and secured shutter control logic 498 thereon, to the actual state of the shutter as detected by the shutter position sensors 480, 482.

As described herein, the MCU 472, upon detection at shutter position sensors 480, 482 (e.g., Hall effect sensors) that the shutter is neither in an open state or a closed state, the MCU 472 makes the comparison of the set state of the shutter to the detected state, and initiates a remedial action as described herein. In an embodiment, an example remedial action may include an auto-recovery process that is initiated by the MCU 472 upon detection that the set state of the shutter does not match the actual state of the shutter. This auto-recovery process may include, in example embodiments, the MCU 472 sending a signal to the camera module holding the camera 458 to actuate the shutter driver and move the shutter. This is done to either close or open the shutter by attempting to move the shutter with the shutter driver hardware 466 along a set of shutter rails. In the instance where the set state of the shutter is to be closed and the actual state of the shutter is neither closed or open per the output from the shutter position sensor (e.g., the Hall effect sensors 480, 482 and the permanent magnet 470), the shutter is in an intermediate position and the actuation of the shutter driver hardware 466 is done to either close or open the shutter fully. Where the additional signal sent from the MCU 472 to either open or close the shutter causes the shutter to be fully opened or closed, the MCU 472 may save the actual state of the shutter within the memory device 497 device as the set state and, where necessary, complete the user's request to place the shutter in the set state requested by initiating another signal to actuate the shutter driver hardware 466 to move the shutter. This may be completed where the user had requested that the shutter be closed, the remedial action by the MCU 472 causes the shutter to be opened, and the request to close the shutter from the user has not been accomplished.

In an embodiment, the remedial action may alternatively or additionally include increasing the voltage applied to the shutter driver hardware 466 to dislodge the shutter. The voltage applied to the shutter driver hardware 466 in order to dislodge the shutter may be increased or decreased over time and/or over a plurality of iterations of attempts to dislodge the shutter. In an embodiment, the increased voltage may increase the action of the shutter driver hardware 466 such as a motor driver used to move the shutter. In an embodiment, the increased voltage signal may be sent to the electromotor driver a plurality times during this remedial action. Where the shutter driver hardware 466 includes an electromagnet, the increased voltage may increase the electric field created by the electromagnet and, with this increased electric field, be capable of repelling or attracting the permanent magnets (e.g., one or more permanent magnets in example embodiments) formed on the shutter or camera 458 body.

In an embodiment, the remedial action may alternatively or additionally include the actuation of a shutter locking pin 476. The shutter locking pin 476 may be a locking pin that mechanically locks the shutter in a closed position, an opened position, or both when the shutter is placed in these actual states. The remedial action conducted by the MCU 472 may include actuating the shutter locking pin 476 either before, after, and/or while the MCU 472 has sent the signal to the shutter driver hardware 466 to either close or shut the shutter during the remedial action. This process may allow the MCU 472 to determine whether the shutter locking pin 476 is preventing the shutter from being completely opened or completely closed as detected by the shutter position sensor or may cause a shift to the shutter to allow movement in the shutter tracks. In an example embodiment, the actuation of the shutter locking pin 476 and the signal being sent to shut the shutter driver hardware 466 may be alternated to dislodge the shutter from the position it is in.

It is appreciated that any of these remedial actions may be completed any number of times. Further, multiple remedial actions may be completed in various orders. The order of any remedial actions may vary and may, in an example embodiment, include the repetition of a single type of remedial action. By executing multiple types of remedial actions, any number of times, and in any order, the MCU 472 may better dislodge the shutter to place the shutter in a closed or open state. In an example embodiment, the order of operation in attempting to move the shutter via the shutter control hardware 466 and moving the shutter locking pin 476 may be varied in order to increase the likelihood of dislodging the shutter. The voltage applied to the shutter driving control hardware 475 may also be varied during this process to increase the likelihood of dislodging the shutter.

In an embodiment, the MCU 472 may provide a user with various notices as to the actual state of the shutter and/or if and when remedial actions have been taken and the results of those remedial actions. In an example embodiment, the MCU 472 may maintain a count of how many times a remedial action was conducted based on the set state of the shutter not matching the actual state of the shutter. This count may be maintained within the memory device 497. In an embodiment, when a threshold number of remedial actions has taken place, the MCU 472 may cause an information handling system assist software 492 GUI 486 to be presented to the user at the video display device 442 of the information handling system informing the user that these remedial actions has taken place. This GUI 486 may further indicate to a user that the shutter may need repairing, provide contact information for a repairman or repair location, and other information including warranty information. In an example embodiment, where there has been multiple successful remediations, the information handling system may notify the user of any impending failures in order to engage in actions to repair the shutter before it fails, and a remedial action cannot fix the shutter. As described herein, this may include providing contact information to a manufacturer of the information handling system.

The MCU 472 may further provide warning information on the GUI 486 presented to the user. For example, in the instances where the remedial action conducted by the MCU do not result in a correction of the actual state of the shutter to match the set state of the shutter, the MCU 472 may provide a warning to be displayed on the video display device 442 that the shutter is not operating properly. This warning may be presented so that a view of the user by the camera 458 may not be captured without the user's consent and after a request to place the shutter in a closed state. In an example embodiment, where a user has requested to set the shutter to a closed state and the MCU 472 but the detected actual state does not match the set state as a closed state, the MCU 472 may prevent images of the user from being captured by the camera 458 by, for example, blocking the video stream from being transmitted to the processor and being used during, for example, a videoconferencing session. This is done in the event that the MCU 472 cannot successfully perform a remedial action to render the shutter closed in some embodiments. It is appreciated that at any point during the process of detecting the actual state of the shutter and the performance of any remedial action, the video stream may be blocked as an additional precaution so that the image of the user is not seen by anyone without the user's knowledge. In an embodiment, the MCU 472 may immediately prevent images of the user from being captured by the camera 458 when the MCU has determined that the actual state of the shutter does not match the set state of the shutter as described herein. Upon successful remediation, the images may no longer be blocked, and the camera may again be allowed to capture images upon determination that the set state and the detected actual state of the shutter match.

In one example embodiment, the MCU 472 may accomplish confirming the actual state of the shutter and initiating blocking image capture when a closed set state does not appear to be accurate with the actual state of the shutter by interfacing with a vision sensing integrated circuit (IC) 484. The vision sensing IC 484 operates with an ambient light sensor or digital signal processing of light, color, or images detected by the camera to determine if an image is being captured by the camera 458 or light is being received and to send a command to block the video stream from being transmitted to the processing unit, CPU, processor, GPU, or other processing resource within the information handling system. In an embodiment, the MCU 472 or EC 488 or other processor may interface with a control panel agent of the information handling system assist software 492 executed by the platform controller hub (PCH) 490 or the embedded controller 488 or some combination that provides tools and diagnostics for the information handling system on behalf of, for example, the manufacturer. This control panel agent may include the SupportAssist® by Dell®. By interfacing with vision sensing IC 484, the MCU 472, and the EC 488, then the information handling system assist software 492 may provide diagnostic information related to the remedial actions, if any, that were conducted by the MCU 472 so that the control panel agent may contact the user in an attempt to repair the shutter, if necessary, according to embodiments herein.

Figure 5:
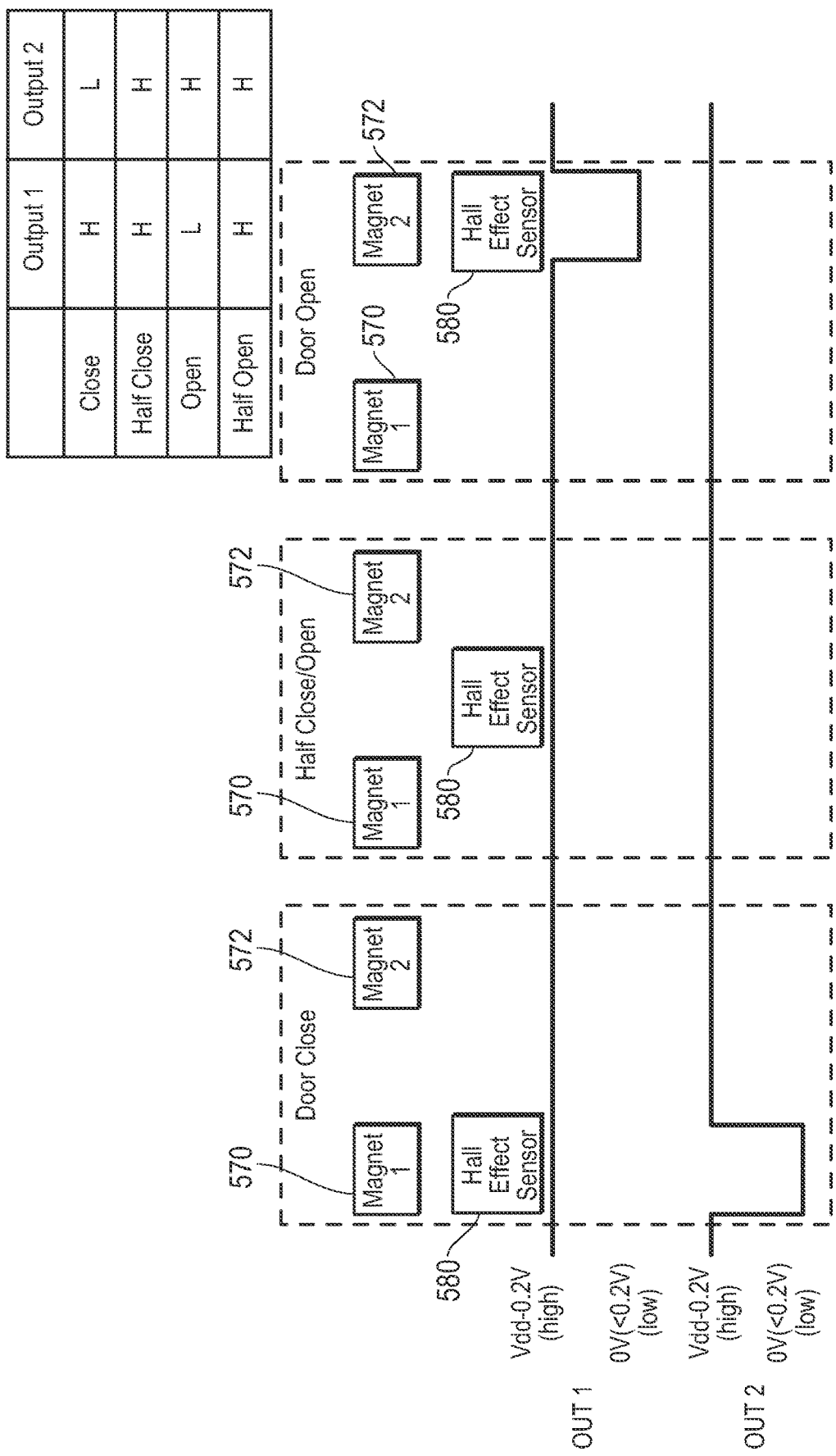
FIG. 5 is a voltage diagram of a hall effect sensor used as a shutter position sensor according to an embodiment of the present disclosure.

FIG. 5 is a voltage diagram of a hall effect sensor 580 used as a shutter position sensor according to an embodiment of the present disclosure. In the embodiment of FIG. 5, the Hall effect sensor 580 may be placed on the shutter at a location where the Hall effect sensor 580 can detect a voltage when either of the first permanent magnet 570 or second permanent magnet 572 are located near the Hall effect sensor 580. In other embodiments, such as discussed in FIG. 4, the Hall effect sensors 480, 482 may be mounted on a camera housing and a magnet 470 mounted to a moving shutter. The first permanent magnet 570 and second permanent magnet 572 may be placed opposite the Hall effect sensor 580 either on the shutter or on the camera 458, respectively. The orientation of the Hall effect sensor 580 to the first permanent magnet 570 and second permanent magnet 572 allows the Hall effect sensor 580 to detect the magnetic field created by either of these magnets 570, 572 when the shutter is in an open or closed state. For example, when the shutter is in a closed state as show in FIG. 5, the Hall effect sensor 580 detects the magnetic field of the first permanent magnet 570 and sends a signal to the MCU that the shutter is closed. In an example embodiment, the shutter is fully closed when the Hall effect sensor 580 detects a threshold voltage difference caused by the presence of the first permanent magnet 570. In an example embodiment, the threshold voltage difference is +0.2 V. Where no voltage difference is detected (e.g., 0 V), the shutter is determined to be either being conveyed from a closed position to an open position, or vice versa, or is at an intermediate state where the shutter is stuck and requires the MCU to initiate a remedial action as described herein.

In a similar example embodiment, the shutter is fully open when the Hall effect sensor 580 detects a threshold voltage difference caused by the presence of the second permanent magnet 572. Again, this threshold voltage difference may be +2.0 V in an example embodiment. Other threshold voltage differences may be detected including threshold voltage differences between the interaction between the first permanent magnet 570 and the Hall effect sensor 580 as compared to the second permanent magnet 572 interacting with the Hall effect sensor 580.

As described herein, where the threshold voltage difference is not detected by the Hall effect sensor 580 and a signal to either open or close the shutter has already been sent by the MCU, the MCU may compare a set state of the shutter (e.g., requested by the user via actuation of a key) to the actual state of the shutter. This may be done by determining whether the threshold voltage difference has been met at the Hall effect sensor 580. Where it has not, the MCU may initiate a remedial action to move the shutter to a completely closed or completely open state, if possible.

Figure 6:
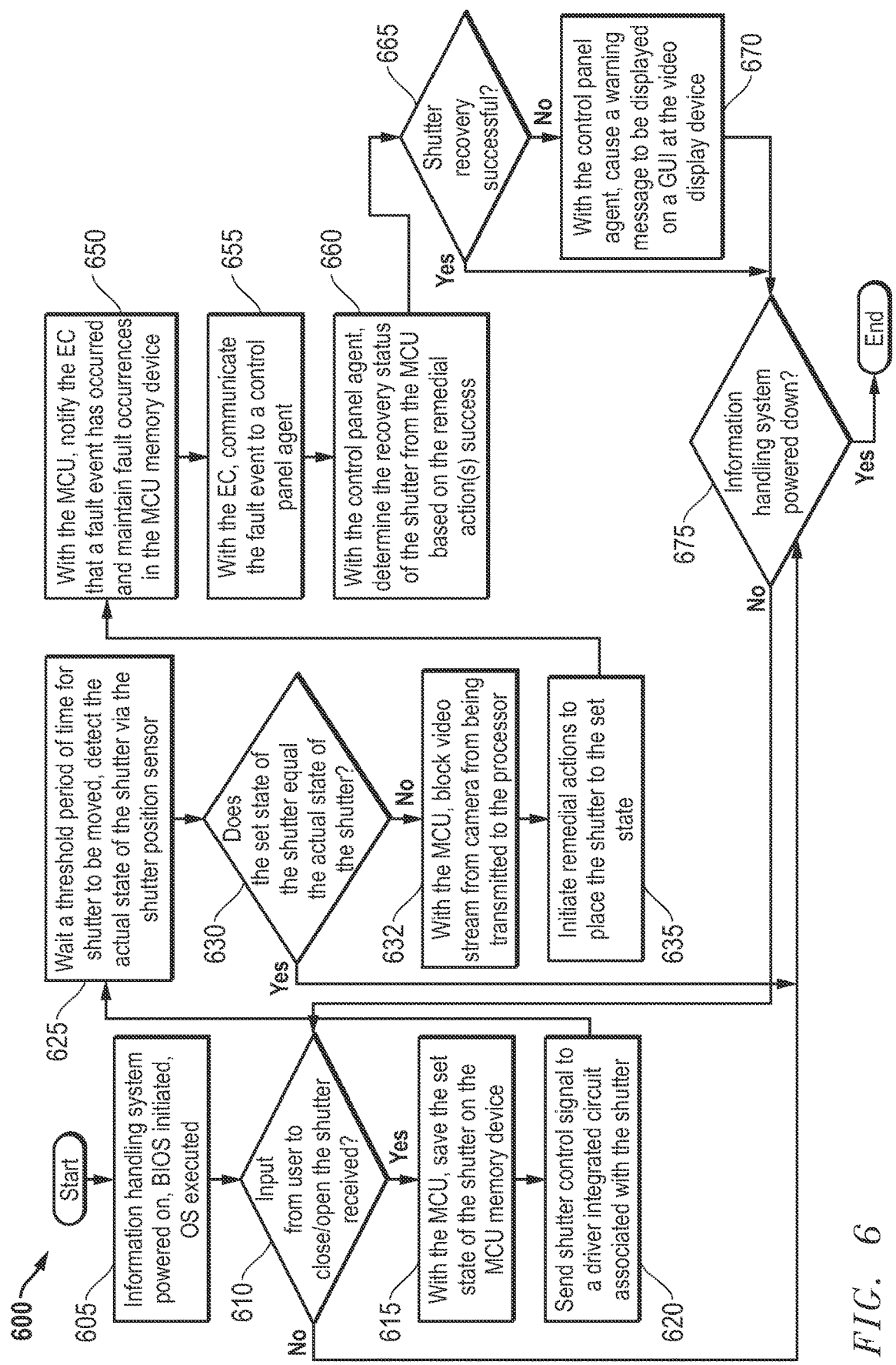
FIG. 6 is a flow diagram of a method of controlling a shutter on a camera according to an embodiment of the present disclosure.

FIG. 6 is a flow diagram of a method 600 of controlling a shutter on a camera according to an embodiment of the present disclosure. The method describes a situation where a user actuates a key or otherwise provides input to close the shutter, the MCU described herein may be used to drive the transition of the shutter driver to actuate the shutter, determine if proper operation of the shutter has taken place, and initiate any remedial actions if the shutter is stuck or does the set state of the shutter does not match the actual state of the shutter.

The method 600 may begin with the information handling system being powered on with the BIOS being initiated and the OS being executed at block 605. The information handling system, in an embodiment, may be a laptop type information handling system that includes a camera formed in a bezel of a video display device used to capture a user's image during, for example, a videoconference session.

The method includes, at block 610, determining whether input from a user to close or open the shutter has been received. As described herein, the user may toggle the shutter between a closed state and an open state via a shutter driver hardware and secured shutter control logic executed on an MCU. In an embodiment, the user may provide input to toggle the shutter. This input may be the pressing of a key such as an F9 key on a keyboard of the information handling system. The actuation of this key may, in an embodiment, be received at a secured hardware control circuit via actuation of the F9 key. This key actuation is sent to a secured shutter control logic on the MCU which provides a signal to the shutter driver hardware, such as shutter motor, to open the shutter, of closed, to allow video to be captured of the environment in front of the information handling system as well allowing the user to close the shutter if in an open state. The key actuation allows the user to toggle between these closed and open states.

Where it has been determined at block 610 that the input to close or open the shutter has not been received, the method 600 may proceed with determining whether the information handling system has been powered down at block 675. Where it has been determined that the user has actuated the input key to close or open the shutter at block 610, the method 600 may continue at block 615 with saving the set state of the shutter to the memory device described herein. The MCU may do this so that the set state of the shutter may be later compared to an actual state of the shutter.

The method 600 further includes, at block 620, sending shutter control signals to a driver integrated circuit (IC) and driver actuator (e.g., motor or magnetic actuator) of the shutter driver hardware associated with the shutter. These signals may, in this example embodiment, the MCU may send a signal from the secured shutter control logic executing thereon to the driver IC in order to activate a motor that drives the shutter to close or open it. In this example embodiment, the MCU sends a signal to the driver IC to close the shutter. In an embodiment, the MCU may be operating below the BIOS and/or OS of the information handling system and with secured firmware isolated from operation of the OS or BIOS in order to allow for the user to control the shutter independent of any software or hardware operating on the information handling system. This provides security from potential unauthorized access.

The method 600 may further include waiting a threshold period of time for the shutter to be moved in place (e.g., to be moved to a closed position) by the shutter actuator of the shutter driver hardware at block 625. In an embodiment, the MCU may also, at block 625, detect the actual state of the shutter via the shutter position sensor. As described herein, the shutter position sensor may include one or more Hall effect sensors interacting with one or more permanent magnets. The Hall effect sensor or sensors may be attached to either of the camera or the shutter while the one or more permanent magnets are attached to the opposite of the Hall effect sensor(s). As the position of the Hall effect sensor relative to a permanent magnet change, the Hall effect sensor detects changes in voltage across a conductor in the Hall effect sensor. When a threshold voltage difference is detected, the Hall effect sensor may notify the MCU that the shutter is either in a closed or open position based on the output channel of the Hall effect sensor. Any engagement of Hall effect sensors or magnets between the shutter and the camera housing is contemplated in various embodiments.

The method 600 further includes determining if the set state of the shutter matches or is equal to the actual state of the shutter at block 630. As described herein, the set state (e.g., closed position requested by the user by pressing F9) was previously stored in the MCU storage device. With the actual state of the shutter being detected by the Hall effect sensor and relayed to the MCU, the MCU may compare this set state to the actual state to determine if they match. Where the set state of the shutter matches the actual state of the shutter at block 630, the method 600 may continue to block 675 to determining whether the information handling system has been powered down. Where it has been powered down, the method 600 may end. Where the information handling system has not been powered down at block 665, the method 600 may continue to block 610 to monitor for user input to toggle the shutter and for the method 600 to continue as described herein.

Where the set state of the shutter does not match the actual state of the shutter at block 630, the method 600 may continue with the MCU operating with the EC and other processing on the information handling system to block any video streaming from the camera from being transmitted to the processor at block 632. Again, immediately or at any point during the process of detecting the actual state of the shutter and the performance of any remedial action, the video stream may be blocked as an additional precaution so that the image of the user is not seen by anyone without the user's knowledge.

The method 600 may include performing a remedial action to place the shutter in the set state as requested by the user at block 635. This remedial action may be done upon the video stream from the camera being blocked as a precaution in block 632 as described in embodiments herein. In an embodiment, an example remedial action may include an auto-recovery process. This auto-recovery process may include, in example embodiments, the MCU sending a signal to actuate the shutter to either close or open the shutter by attempting to move the shutter along the shutter rails. In the instance where the set state of the shutter is to be closed and the actual state of the shutter is neither closed or open per the output from the shutter position sensor (e.g., the Hall effect sensor and first permanent magnet and second permanent magnet), the shutter is in an intermediate position and the actuation of the shutter to either close or open the shutter fully. Where the additional signal sent from the MCU to either open or close the shutter causes the shutter to be fully opened or closed, the MCU may save the actual state of the shutter within the memory device as the set state and, where necessary, complete the user's request to place the shutter in the set state requested by initiating another signal to actuate the shutter. This may be completed where the user had requested that the shutter be closed, the remedial action by the MCU causes the shutter to be opened, and the request to close the shutter from the user has not been accomplished.

In an embodiment, the remedial action may alternatively or additionally include increasing the voltage applied to the shutter driver hardware to dislodge the shutter. The voltage applied to the shutter driver hardware to increase force applied to the shutter in order to dislodge the shutter may be increased or decreased over time and/or over a plurality of iterations of attempts to dislodge the shutter. In an embodiment, the increased voltage may increase the action of the shutter driver hardware such as an electric motor driver used to move the shutter in the case of an EM shutter. In an embodiment, the increased voltage signal may be sent to the motor driver a plurality times during this remedial action. Where the shutter driver hardware includes an electromagnet, the increased voltage may increase the electric field created by the electromagnet and, with this increased electric field, be capable of repelling or attracting the permanent magnets (e.g., one or more permanent magnets in example embodiments) formed on the shutter or camera body.

In an embodiment, the remedial action may alternatively or additionally include the actuation of a shutter locking pin. The shutter locking pin may be a locking pin that mechanically locks the shutter in a closed position, an opened position, or both when the shutter is placed in these actual states. The remedial action conducted by the MCU may include actuating the shutter locking pin either before, after, and/or while the MCU has sent the signal to either close or shut the shutter during the remedial action. This process may allow the MCU to determine whether the shutter locking pin is preventing the shutter from being completely opened or completely closed as detected by the shutter position sensor. In an embodiment, the actuation of the shutter locking pin and the signal being sent to shut the shutter may be alternated to dislodge the shutter from the position it is in.

In an embodiment, the remedial action may include causing the shutter to be moved back and forth. The driving of the shutter back and forth may be done randomly to move the shutter from the intermediation position it is in. This randomization of the movement of the shutter may dislodge the shutter from a stuck position in some cases.

It is appreciated that any of these remedial actions may be completed any number of times. Further, multiple remedial actions may be completed in various orders. The order of any remedial actions may vary and may, in an example embodiment, include the repetition of a single type of remedial action. By executing multiple types of remedial actions, any number of times, and in any order, the MCU may better dislodge the shutter to place the shutter in a closed or open state. In an example embodiment, the order of operation in attempting to move the shutter via the shutter driving hardware and moving the locking pin may be varied in order to increase the likelihood of dislodging the shutter. The voltage applied to the shutter driving hardware may also be varied during this process to increase the likelihood of dislodging the shutter.

In an embodiment, the MCU may provide a user with various notices as to the actual state of the shutter and/or if and when remedial actions have been taken and the results of those remedial actions. In an example embodiment, the MCU may maintain a count of how many times a remedial action was conducted based on the set state of the shutter not matching the actual state of the shutter. This count may be maintained within the memory device.

The method 600 may include, at block 650, with a signal to the EC being sent indicating that a fault event has occurred with the MCU. This includes the MCU or the EC maintaining those fault occurrences (e.g., occurrences of the remedial actions taking place) in the memory device. Time stamps of these fault occurrences, they type of faults (e.g., closed when the shutter should be open, open when the shutter should be closed, or the shutter is in an intermediate position), and other data may be maintained on the memory device so that this data may be properly used by a control panel agent as described herein.

The method 600 continues to block 655 with the EC communicating the fault event to the control panel agent. As described herein, the fault event is the type and/or number of remedial actions that needed to have been conducted by the MCU in order to place the shutter in a position (e.g., closed or open) that the user had requested and/or correct the shutter in an intermediate position to the closed (or open) position. In an embodiment, data associated with the type of fault occurrence may be used by the control panel agent to determine which, if any, message to relay to a user of the information handling system as described herein.

At block 660, the control panel agent may determine the recovery status of the shutter as received from the MCU and determine whether the shutter recovery was successful or whether it was unsuccessful at block 655. Again, this determination is based on what remedial actions were taken and whether they were successful or not. Where the shutter was recovered successfully, the method 600 continues to block 675 as described herein. Where, however, the control panel agent has determined that the shutter recovery was not successful at block 665, the method 600 continues to block 670 with the control panel agent causing a warning message to be displayed on an information handling assist system GUI at the video display device of the information handling system. As described herein, a count may be maintained within the memory device counting the number and type of remedial actions conducted by the MCU. In an embodiment, when a threshold number of remedial actions has taken place, the MCU may provide this data to the control panel agent which causes a GUI to be presented to the user at the video display device of the information handling system informing the user that these remedial actions has taken place. This GUI may further indicate to a user that the shutter may need repairing, provide contact information for a repairman or repair location, and other information including warranty information.

After displaying the warning to the user as described herein, the method 600 may continue to block 675 with determining whether the information handling system has been powered down. Where it has been powered down, the method 600 may end. Where the information handling system has not been powered down at block 675, the method 600 may continue to block 610 to monitor for additional toggle command for the shutter and for the method 600 to continue as described herein.

Figure 7:
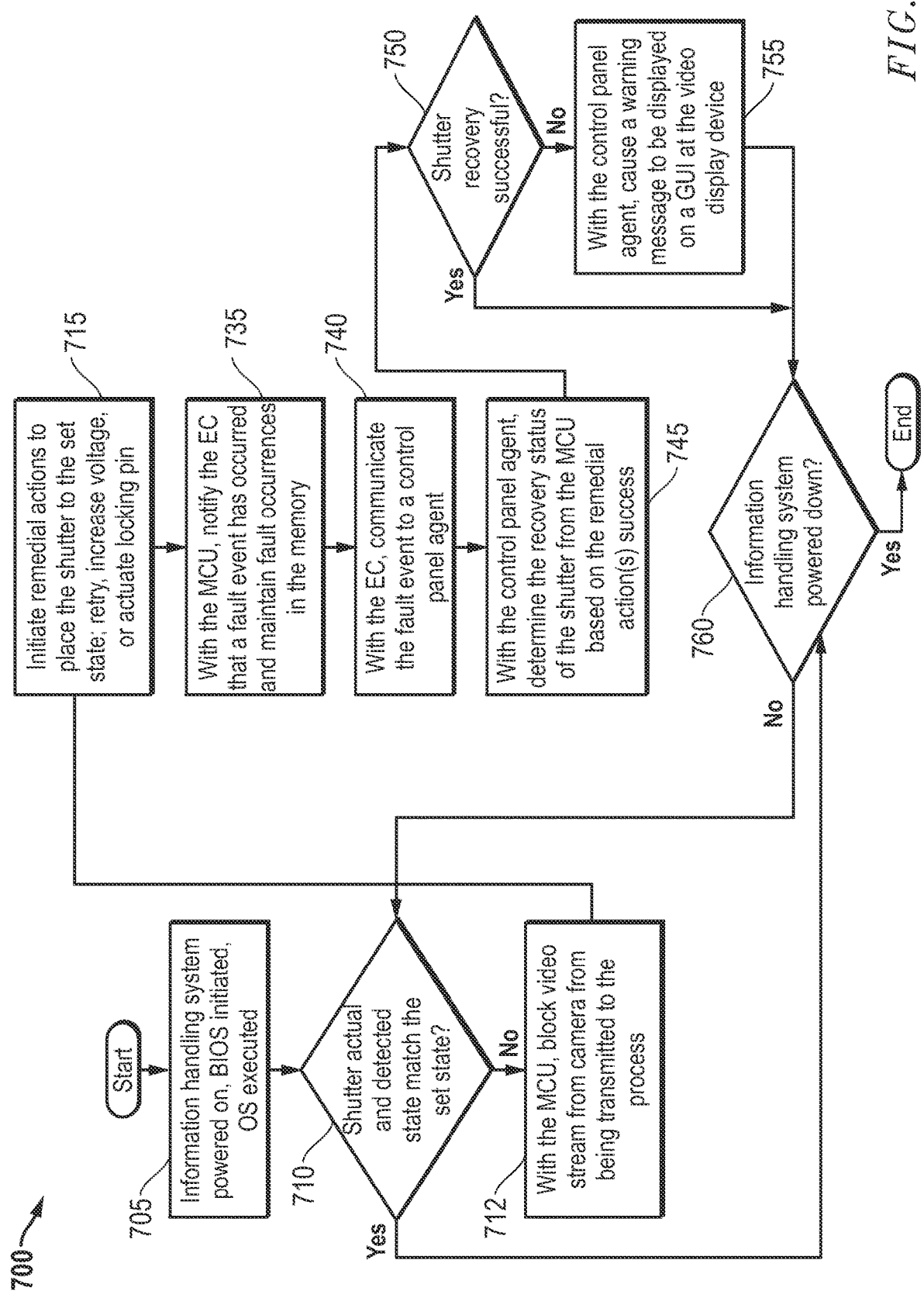
FIG. 7 is a flow diagram of a method of controlling a shutter on a camera according to another embodiment of the present disclosure.

FIG. 7 is a flow diagram of a method 700 of controlling a shutter on a camera according to another embodiment of the present disclosure. The method 700 described in connection with FIG. 7 may describe a process that is conducted when the shutter is detected in an actual state that differs from the set state based on received user input. For example, a user or an error may unintentionally toggle the state of the shutter without proving user input via an input key. This may happen when, for example, the shutter was intended to be closed by was bumped open when, for example, the user was in a videoconference session. Because the shutter is a mechanical device, bumping the information handling system or another error may dislodge or move the shutter from an open state to a closed state, from a closed state to an open state, or from either an open or closed state to an intermediate state.

The method 700 may include, at block 705, the information handling system being powered on with the BIOS being initiated and the OS being executed. The information handling system, in an embodiment, may be a laptop type information handling system that includes a camera formed in a bezel of a video display device used to capture a user's image during, for example, a videoconference session.

The method 700 further includes determining, at block 710, whether the shutter state detected does not match the set state, for example, it has been unintentionally toggled. As described herein, because the shutter is a mechanical device, bumping the information handling system may accidentally move the shutter out of place in one example of an error that may occur. In an embodiment, the MCU may be continuously monitoring and receiving input from the shutter position sensor (e.g., the one or more Hall effect sensors and permanent magnets) to determine wither the set state of the shutter has been maintained and whether the set state matches the actual detected state of the shutter. Where the set state of the shutter does match the actual detected state of the shutter, the method continues to block 760 with determining whether the information handling system has been powered down. Where it has been powered down, the method 700 may end. Where the information handling system has not been powered down at block 760, the method 700 may continue to block 710 to continue to monitor for whether the set state of the shutter matches the actual detected state of the shutter as described herein.

Where the set state of the shutter does not match the actual detected state of the shutter, such as even after the information handling system has been bumped, the method 700 continues to block 712 with the MCU, EC, or other processor blocking any video streaming from the camera from being transmitted to the processor of the information handling system to allow images to be captured by the camera as a precaution while the shutter is subject to remediation to correct the actual state of the shutter with the set state received by a user via a keypress, button, capacitive touch or other toggle input. It is appreciated that at any point during the process of detecting the actual state of the shutter and the performance of any remedial action, the video stream may be blocked as an additional precaution so that the image of the user is not seen by anyone without the user's knowledge in other embodiments.

At block 715, the method 700 continues with initiating a remedial action as described herein. In an embodiment, an example remedial action may include an auto-recovery process. This auto-recovery process may include, in example embodiments, the MCU sending a signal to actuate the shutter to either close or open the shutter by attempting to move the shutter along the shutter rails. In the instance where the set state of the shutter is to be closed and the actual state of the shutter is neither closed or open per the output from the shutter position sensor (e.g., the Hall effect sensor and first permanent magnet and second permanent magnet), the shutter is in an intermediate position and the actuation of the shutter to either close or open the shutter fully. Where the additional signal sent from the MCU to either open or close the shutter causes the shutter to be fully opened or closed, the MCU may save the actual state of the shutter within the memory device as the set state and, where necessary, complete the user's request to place the shutter in the set state requested by initiating another signal to actuate the shutter. This may be completed where the user had requested that the shutter be closed, the remedial action by the MCU causes the shutter to be opened, and the request to close the shutter from the user has not been accomplished.

In an embodiment, the remedial action may alternatively or additionally include increasing the voltage applied to the shutter driver control hardware to dislodge the shutter. The voltage applied to the shutter driver control hardware in order to dislodge the shutter may be increased or decreased over time and/or over a plurality of iterations of attempts to dislodge the shutter. In an embodiment, the increased voltage may increase the action of the shutter driver hardware such as a motor driver used to move the shutter. In an embodiment, the increased voltage signal may be sent to the motor driver a plurality times during this remedial action. Where the shutter driver hardware includes an electromagnet or an EPM, the increased voltage may increase the electric field created by the electromagnet or EPM and, with this increased electric field, be capable of repelling or attracting the permanent magnets (e.g., first permanent magnet, and a second permanent magnet) formed on the shutter, for example.

In an embodiment, the remedial action may alternatively or additionally include the actuation of a shutter locking pin.

The shutter locking pin may be a locking pin that mechanically locks the shutter in a closed position, an opened position, or both when the shutter is placed in these actual states. The remedial action conducted by the MCU may include actuating the shutter locking pin either before, after, and/or while the MCU has sent the signal to either close or shut the shutter during the remedial action. This process may allow the MCU to determine whether the shutter locking pin is preventing the shutter from being completely opened or completely closed as detected by the shutter position sensor. In another embodiment, the actuation of the shutter locking pin and the signal being sent to shut the shutter may be alternated to dislodge the shutter from the position it is in.

In an embodiment, the MCU may provide a user with various notices as to the actual state of the shutter and/or if and when remedial actions have been taken and the results of those remedial actions. In an example embodiment, the MCU may maintain a count of how many times a remedial action was conducted based on the set state of the shutter not matching the actual state of the shutter. This count may be maintained within the memory device.

The method 700 continues to block 735 where a signal to the EC is sent indicating that a fault event has occurred with the MCU. This includes the MCU maintaining those fault occurrences (e.g., occurrences of the remedial actions taking place) in the memory device. Time stamps of these fault occurrences, they type of faults (e.g., closed when the shutter should be open, open when the shutter should be closed, or the shutter is in an intermediate position), and other data may be maintained on the memory device so that this data may be properly used by a control panel agent as described herein.

The method 700 continues to block 740 with the EC communicating the fault event to the control panel agent. As described herein, the fault event is the type and/or number of remedial actions that needed to have been conducted by the MCU in order to place the shutter in a position (e.g., closed or open) that the user had requested and/or correct the shutter in an intermediate position to the closed (or open) position. In an embodiment, data associated with the type of fault occurrence may be used by the control panel agent to determine which, if any, message to relay to a user of the information handling system as described herein.

At block 745, the control panel agent may determine the recovery status of the shutter as received from the MCU and determine whether the shutter recovery was successful or whether it was unsuccessful at block 750. Again, this determination is based on what remedial actions were taken and whether they were successful or not. Where the shutter was recovered successfully, the method 700 continues to block 755 as described herein. Where, however, the control panel agent has determined that the shutter recovery was not successful at block 750, the method 700 continues to block 755 with the control panel agent causing a warning message to be displayed on an information handling assist system GUI at the video display device of the information handling system. As described herein, a count may be maintained within the memory device counting the number and type of remedial actions conducted by the MCU. In an embodiment, when a threshold number of remedial actions has taken place, the MCU may provide this data to the control panel agent which causes a GUI to be presented to the user at the video display device of the information handling system informing the user that these remedial actions has taken place. This GUI may further indicate to a user that the shutter may need repairing, provide contact information for a repairman or repair location, and other information including warranty information.

After displaying the warning to the user as described herein, the method 700 may continue to block 760 with determining whether the information handling system has been powered down. Where it has been powered down, the method 700 may end. Where the information handling system has not been powered down at block 760, the method 700 may continue to block 710 to determine whether the shutter state detected does not match the set state, for example, it has been unintentionally toggled and for the method 700 to continue as described herein.

The blocks of the flow diagrams of FIGS. 6 and 7 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. An information handling system comprising:
a processor;
a memory device;
a power management unit (PMU);
a camera formed into a chassis of the information handling system, the camera including:
    a lens;
    a shutter to block the capture of an image by the camera;
    shutter driver hardware to actuate shutter movement between an open state and a closed state; and
    a shutter position sensor to detect the position of the shutter;

a microcontroller unit operatively coupled to the camera to:
receive input describing a set state of the shutter received from user toggle input;
compare the set state of the shutter to a detected state of the shutter detected by the shutter position sensor; and
initiate remedial action to actuate the shutter driver hardware to change the detected state of the shutter when the detected state of the shutter differs from the set state of the shutter.

2. The information handling system of claim 1 further comprising:
the shutter position sensor including:
a hall effect sensor formed on the camera;
a magnet formed on the shutter;
the hall effect sensor to detect the magnetic field of the magnet to determine the state of the shutter in the open state or the closed state.

3. The information handling system of claim 1 further comprising:
the shutter position sensor including:
a hall effect sensor formed on the shutter;
a magnet formed on the camera;
the hall effect sensor to detect the magnetic field of the magnet to determine the state of the shutter in the open state or the closed state.

4. The information handling system of claim 1 further comprising:
the microcontroller to detect when the set state of the shutter and the detected state of the shutter as detected by the shutter position sensor are not the same; and
initiate a remediation process that includes one or more of:
activating the shutter driver hardware to move the shutter;
pulsing the activation of the shutter driver hardware to move the shutter;
actuating a locking pin that locks the shutter in an open or closed position; or
changing the order of operation of the shutter and locking pin.

5. The information handling system of claim 4, wherein when the remediation process initiated by the microcontroller does not cause the set state of the shutter to be the same as the detected state of the shutter as detected by the shutter position sensor, the microcontroller blocks the transmission of video/audio stream originating at the camera to the processor.

6. The information handling system of claim 4, wherein when the remediation process initiated by the microcontroller does not cause the set state of the shutter to be the same as the detected state of the shutter as detected by the shutter position sensor, the microcontroller causes a message to be presented to a user at a video display device of the information handling system, the message notifying the user that the shutter is not working.

7. The information handling system of claim 1 further comprising:
a printed circuit board (PCB) forming a camera module where the camera is housed having the camera, the shutter, a shutter housing and track, and the shutter driver hardware that includes a shutter driver motor to actuate movement of the shutter along the shutter track.

8. The information handling system of claim 1 further comprising:
the microcontroller unit to execute secured shutter control logic to actuate the shutter driver hardware, where the secured shutter control logic is used to prevent the data from being accessed via a bus of the information handling system.

9. The information handling system of claim 1 further comprising:
shutter driver hardware including a magnetic shutter actuation device to use a magnetic field to move the shutter.

10. A shutter control and remediation system comprising:
a memory device;
a camera module, including:
a camera;
a shutter to block the capture of an image by the camera;
shutter driver hardware to actuate shutter movement between an open state and a closed state;
shutter rails for the shutter to move along when moving over and away from the camera; and
a shutter position sensor to detect the position of the shutter;
a microcontroller unit operatively coupled to the camera module to:
receive input describing a set state of the shutter;
compare the set state of the shutter received from a user toggle input to a detected state of the shutter detected by the shutter position sensor; and
initiate remedial action to actuate the shutter driver hardware to change the detected state of the shutter when the detected state of the shutter differs from the set state of the shutter.

11. The shutter control and remediation system of claim 10 further comprising:
the shutter position sensor including:
a plurality of hall effect sensors formed on the camera;
one or more magnets formed on the shutter;
a first hall effect sensor to detect the magnetic field of the one or more magnets to determine the detected open state of the shutter; and
the second hall effect sensor to detect the magnetic field of the one or more magnets to determine the detected closed state of the shutter.

12. The shutter control and remediation system of claim 10 further comprising:
the shutter position sensor including:
a hall effect sensor formed on the shutter;
one or more magnets formed on the camera;
the hall effect sensor to detect the magnetic field of the one or more magnets to determine the detected state of the shutter in the open state or the closed state.

13. The shutter control and remediation system of claim 10 further comprising:
the microcontroller to detect when the set state of the shutter and the detected state of the shutter as detected by the sensor are not the same; and
initiate a remediation process that includes one or more of:
activating the shutter;
pulsing the activation of the shutter; or
actuating a locking pin that locks the shutter in an open or closed position.

14. The shutter control and remediation system of claim 10, wherein when the remedial action initiated by the microcontroller does not cause the set state of the shutter to be the same as the detected state of the shutter as detected by the sensor, the microcontroller blocks the transmission of video/audio stream originating at the camera.

15. The shutter control and remediation system of claim 10, wherein when the remedial action initiated by the microcontroller does not cause the set state of the shutter to be the same as the detected state of the shutter as detected by the sensor, the microcontroller causes a message to be presented to a user at a video display device of the information handling system, the message notifying the user that the shutter is not working.

16. The shutter control and remediation system of claim 10 further comprising:
   shutter driver hardware including a magnetic shutter actuation device to use a magnetic field to move the shutter.

17. A method of controlling a shutter on a web camera at an information handling system comprising:
   with a microcontroller unit (MCU), receiving toggle input describing a set state of the shutter of a camera, the set state of the shutter being initiated by a user of the web camera via the toggle input;
   with a shutter position sensor operatively coupled to the MCU, detecting the position of the shutter;
   with the MCU:
      comparing the set state of the shutter to a detected state of the shutter detected by the shutter position sensor; and
      initiating remedial action, via actuation of shutter driver hardware, to change the detected state of the shutter when the detected state of the shutter differs from the set state of the shutter.

18. The method of claim 17, further comprising:
   with a signal from the MCU to shutter driver hardware, toggling the shutter between an open position and a closed position in response to the set state from the received toggle input.

19. The method of claim 17 further comprising:
   the shutter position sensor including:
      a hall effect sensor formed on the camera;
      a magnet formed on the shutter;
   the hall effect sensor to detect the magnetic field of the one or more magnets to determine the state of the shutter in an open state or a closed state.

20. The method of claim 17 further comprising:
   with the MCU, detecting when the set state of the shutter and the state of the shutter as detected by the sensor are not the same; and
   initiating the remedial action that includes one or more of:
      activating the shutter;
      pulsing the activation of the shutter; or
      actuating a locking pin that locks the shutter in an open or closed position.

* * * * *